(12) United States Patent
Ey

(10) Patent No.: US 6,298,742 B1
(45) Date of Patent: Oct. 9, 2001

(54) SELECTOR FOR AN AUTOMATIC MOTOR VEHICLE TRANSMISSION

(75) Inventor: Peter von Ey, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/300,526

(22) Filed: Apr. 28, 1999

(30) Foreign Application Priority Data

Apr. 28, 1998 (DE) .............................................. 198 18 867

(51) Int. Cl.⁷ .................................................. B60K 20/02
(52) U.S. Cl. .................................. 74/473.23; 74/473.21; 192/220.4
(58) Field of Search ............................ 74/473.21, 473.22, 74/473.23, 483 R; 192/220.2, 220.3, 220.4, 220.7; 477/96

(56) References Cited

U.S. PATENT DOCUMENTS

| | | |
|---|---|---|
| 5,226,303 | 7/1993 | Dieden et al. . |
| 5,263,383 * | 11/1993 | Meisch et al. ..................... 74/473.23 |
| 5,551,266 * | 9/1996 | Behrens ............................ 74/473.21 |
| 5,695,029 | 12/1997 | Yokoyama et al. . |
| 5,950,782 * | 9/1999 | Brauns et al. ..................... 74/473.21 |
| 6,059,687 * | 5/2000 | Durieux et al. ........................ 477/96 |

FOREIGN PATENT DOCUMENTS

| | | |
|---|---|---|
| 34 19 168 | 11/1985 | (DE) . |
| 41 20 379 | 1/1993 | (DE) . |
| 41 18 519 | 2/1993 | (DE) . |
| 196 41 706 | 3/1998 | (DE) . |
| 0 852 307 | 7/1998 | (EP) . |
| 3-239868 | 10/1991 | (JP) . |
| 6-117526 | 4/1994 | (JP) . |
| 6-94112 | 4/1994 | (JP) . |

\* cited by examiner

Primary Examiner—David A. Bucci
Assistant Examiner—William C Joyce
(74) Attorney, Agent, or Firm—Crowell & Moring LLP

(57) ABSTRACT

A rocker has a least one rocker arm and is urged by a spring member into a rocker end position and by an electromagnetically actuated control member into an opposite rocker arm end position. The respective upwardly tilted rocker end serves as a latch for a selector element so that the adjustment movements of the selector element in one or more predetermined adjustment positions (P, R, N, D) is allowed or prevented under certain operating conditions.

13 Claims, 30 Drawing Sheets

SELECTOR FOR AN AUTOMATIC MOTOR VEHICLE TRANSMISSION

BACKGROUND AND SUMMARY OF THE INVENTION

This application claims the priority of German Application No. 198 18 867.6, filed Apr. 28, 1998, the disclosure of which is expressly incorporated by reference herein.

The invention relates to a selector for an automatic motor vehicle transmission and, more particularly, to a selector including a selector lever, a latching lever, a two armed rocker, latching surfaces and a control member.

The invention relates to all types of automatic transmissions, for example fully automatic and partially automatic gear boxes; in addition, so-called torque converter automatic transmissions and continuously variable transmissions with continuously variable transmission ratios with or without gears.

A selector of this type is described in German patent document DE-C 196 41 706 (corresponding to U.S. application Ser. No. 08/948,419, filed Oct. 10, 1997, the specification of which is incorporated by reference herein). The selector element is a pivotably mounted selector lever that can be pivoted in the direction of a park position P through a reverse position R into a neutral position N in which the torque transmission of the vehicle gearbox is interrupted. The lever can then be pivoted into at least one forward position D.

Latches are provided for positions P and N. The latches operate as a function of certain operating conditions. In the park position P, the selector lever is locked for as long as the vehicle brake is not actuated and the ignition key is not in the ignition lock (or the ignition is not switched on). As soon as the ignition key is inserted into the ignition lock (or the ignition is switched on) and the brake is actuated, the selector lever is released. This function is referred to in the following as the P latch. A latch is likewise provided for moving the selector lever from the neutral position N into the reverse position R, said latch being active for as long as the vehicle speed does not drop below a certain limit. This function is referred to in the following as the R latch. Moving the selector lever from D to N however is not impeded by this latch. These functions are achieved by the subject of the above-mentioned German patent document which has not yet been published.

A system is known from Japanese Patent document JP 3-239868 A in which the latching of the selector lever in the park position P and in the reverse position R can be released by energizing an electromagnet. The latching function is maintained by a spring force. Therefore, it is not possible to move the selector into the park position P in the event of an overall power failure in the entire vehicle system. As a result, it is also not possible to park the car safely because the ignition key can be removed from the ignition lock only when the selector lever is in the P position. In addition, a selector is known from Japanese Patent document JP 6-117526 A in which a selector lever is immovably connected with a latching link provided with latching cams. A selector for an automatic transmission with a selector lever is known from German Patent document DE-A-41 18 519, said lever being adjustable from a neutral position (N) into a forward driving position (D) and beyond these positions into one or more low-speed shift positions (1, 2). In the opposite direction, the lever is adjustable into a reverse position (R) and beyond the latter into a park position (P). A manual downshift from a higher speed to a lower speed is automatically blocked if a critical state of the vehicle would result from such a downshift.

The actuators that lock or unlock the latch are electromagnetic control elements and springs but can also be other elements. The latches are not supposed to be unlocked by the selector element as a result of the manual operating force of the driver if the operating conditions required for unlocking are not present. Such conditions can be, for example, a driving authorization by the driver, an ignition key in the ignition lock, and a vehicle speed below or above a certain limiting value. On the other hand, an actuator is supposed to be able to unlock the latch when all the operating conditions are met, but the driver exerts a manual actuating force on the selector element before these operating conditions are met. In this case, there is the danger that the mechanical latching elements will be so strongly pressed together by the manual actuating force at the selector lever that they can no longer be torn apart by an actuator, or the actuator would have to be of a size that was unacceptable as far as space requirements and weight were concerned or because of the operating heat developed by it. The larger an electromagnetic control element is, the greater the heat that it develops, especially if it is connected to current from the entire vehicle operating system. This situation arises in the selector in German Patent document DE-C 196 41 706 for example when a driver turns on the ignition and then exerts a manual actuating force on the selector lever before he actuates the vehicle brake. Since the electromagnetic actuator is supplied with electric current to unlock the latch when the vehicle brake is actuated, the force of the electromagnetic actuator must also overcome the forces of friction that result from the manual force on the selector lever. Thus, excessive frictional forces are absent only if the driver does not exert an actuating force on the selector lever until he has switched on the ignition and stepped on the brake. Additional selector devices are known from German Patent documents DE-A 34 19 168 and DE-A 41 20 379.

The invention is intended to achieve the goal of providing a compact, small design for a selector which can also lock and unlock reliably without requiring actuators which are larger and stronger than those in the prior art if a manual actuating force is exerted on the selector lever before the operating conditions required for unlocking the selector lever have been met.

This goal is achieved according to the invention by a selector for an automatic motor vehicle transmission, comprising a manual selector lever which is secured by a bearing arrangement and is mounted so that it can be moved back and forth into various positions to select transmission settings; a latching lever which is connected in terms of movement with the selector lever, and its end remote from the selector lever, which is on the side of the bearing arrangement facing away from the selector lever, having a contact surface pointing in one direction of movement and an additional stop surface that points in the opposite direction of movement; a two-armed rocker which is mounted to rotate around a rotational axis that extends transversely to the direction of movement of latching lever, two latching surfaces of which, alternately, one or the other latching surface is movable as a result of the rotation of the rocker in the direction of movement of stop surfaces or the latching lever, and which point in the direction of movement forward or backward away from one another; a spring which urges the rocker into a rocker end position in which a stop surface of the latching lever is blocked by a latching surface of the rocker; and a controllable motorized control member by which the rocker can be urged opposite to the spring force of the spring into the other rocker end position, in which the other stop surface of the latching lever is latched by the other latching surface of the rocker, characterized in that the stop surfaces are formed on outer sides of the latching lever, in that one latching surface is provided on one rocker arm and the other latching surface is located on the other rocker, each at a radial distance from the rotational axis of the rocker, and in that the movement path of the stop surfaces of the latching lever extends transversely over the rotational axis of the rocker.

Additional features of the invention are described herein.

According to the preferred embodiment of the invention, the P latch is passive so that it engages if the motor vehicle operating current fails, and the R latch is active so that it is deactivated when the motor vehicle operating current fails. This is accomplished by virtue of the fact that spring means are provided that urge the latching mechanism into a position that corresponds to the P latch and that control means are provided that are operated pneumatically, hydraulically or preferably electrically. The control means urge the latching mechanisms against the force of the spring means into a position that is associated with the R latch. As a result, the selector element can be set to the park position P even if the operating current fails while the selector element is in a position other than the park position P. This is important for parking the vehicle safely because in modern motor vehicles the vehicle key can be removed from the ignition lock only if the selector element is in the park position P.

The invention also has the advantage that the latch can be safely unlatched by the spring means or the controlled control member when a manual actuating force is applied by a driver to the selector element when not all of the operating conditions for unlatching are in place. For example, according to one preferred embodiment, the controlled control element (or in another embodiment, the spring member) can unlatch the device only if the ignition key is inserted and the ignition is possibly switched on and the vehicle brake is also actuated. In this case, the driver frequently exerts a manual actuating force on the selector element before he operates the vehicle brake. The invention has the advantage that the spring means or the controlled control member can "tear apart" the latching elements and thus bring them into an unlatched position when the operating conditions required for unlatching are met only after a manual actuating force is exerted on the selector element, for example only after the ignition is switched on and/or the brake is activated.

Other objects, advantages and novel features of the present invention will become apparent from the following detailed description of the invention when considered in conjunction with the accompanying drawings.

BRIEF DESCRIPTION OF THE DRAWINGS

FIG. 30 is a schematic top view of the sectional plane XXX—XXX in FIG. 11; and

DETAILED DESCRIPTION OF THE DRAWINGS

Figure 1:
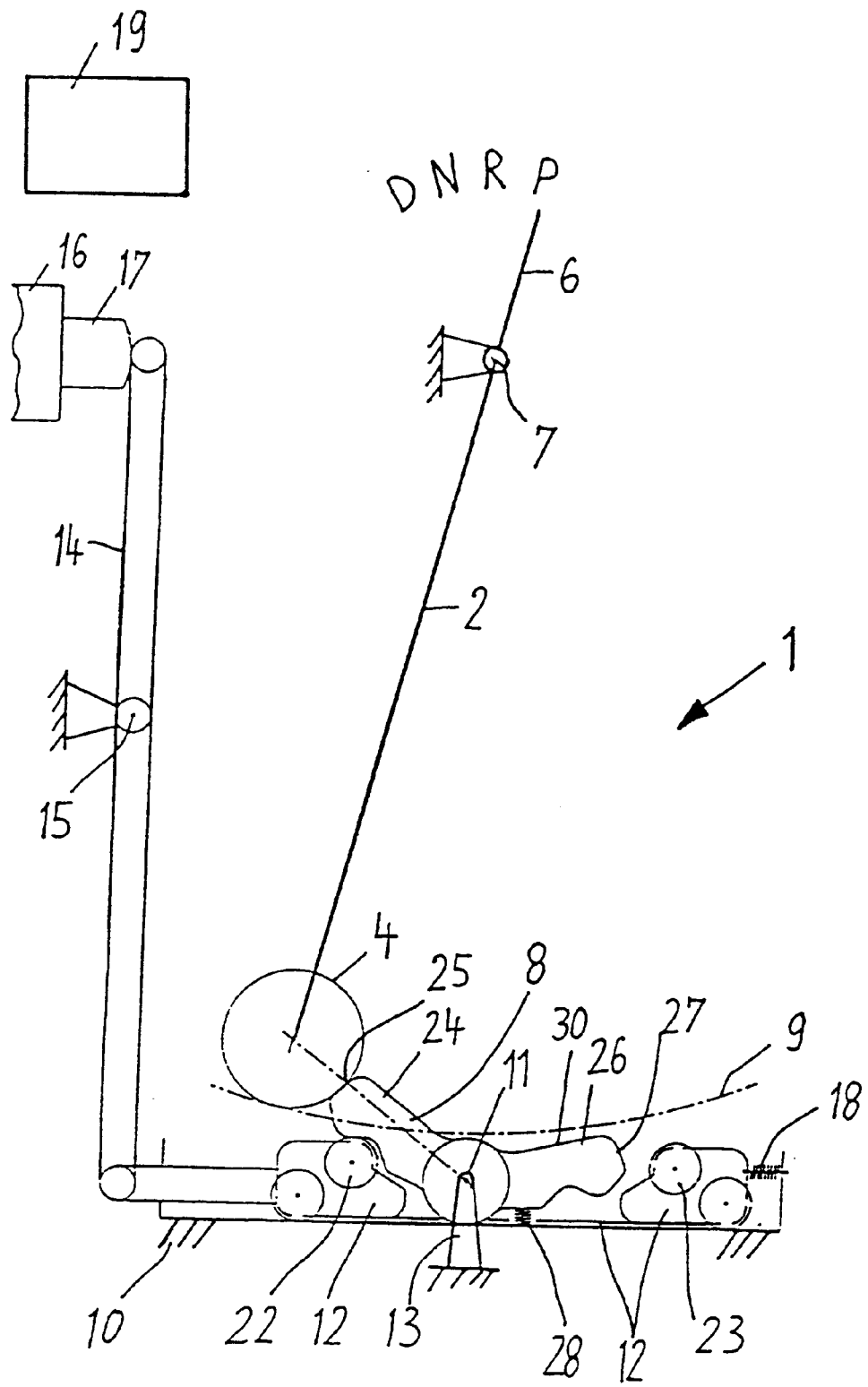
FIGS. 1 to 10 are schematic side views of a first embodiment of a selector according to the invention in various positions that are described below in Table I.

The selector 1 shown in FIGS. 1 to 10 of an automatic transmission contains a latching body in the form of a latching lever 2 on whose lower end a latching part in the form of a roller 4 is mounted in a freely rotatable manner.

Latching lever 2 is pivotable by a selector element connected with it in a non-movable fashion in the form of a selector lever 6 around the fixed latching lever rotational axis 7 (shift shaft), with its roller 4 moving along a circular path 9. A rocker 8 is provided as the latching element. The rocker is mounted in a housing 10 to rotate around a fixed rotational axis 11 for rocker tilting movements. Rocker 8 is guided by a latching window, called the control link 12 in the following, and is tilted into a predetermined position as a function of vehicle operating conditions. Control link 12 is operated by an electromagnetic control member 16 via a two-armed control lever 14 mounted to pivot around a fixed rotational axis 15. The member 16 is controlled by an electronic control device 19. As long as the electromagnetic control member 16 is not activated, in other words is not supplied with current, the position of the control link 12 is determined by a positioning spring 18. Positioning spring 18 in the embodiment shown is a tension spring. It can be replaced by a compression spring located in an opposite position. Tension spring 18 urges control link 12 into the right-hand end position shown in FIG. 1. In this position, it holds the rocker 8 in a rocker end position via a cam roller 22 located at the left end of the left-hand rocker arm 24. Here, the left-hand rocker arm 24 is in an upper rocker end position and the right-hand rocker arm 26 is in a lower rocker end position. A second cam roller 23 of control link 12, associated with the right-hand rocker arm 26 and located at the right, is located to the right of the right-hand rocker arm 26 and not engaged therewith.

Figure 2:
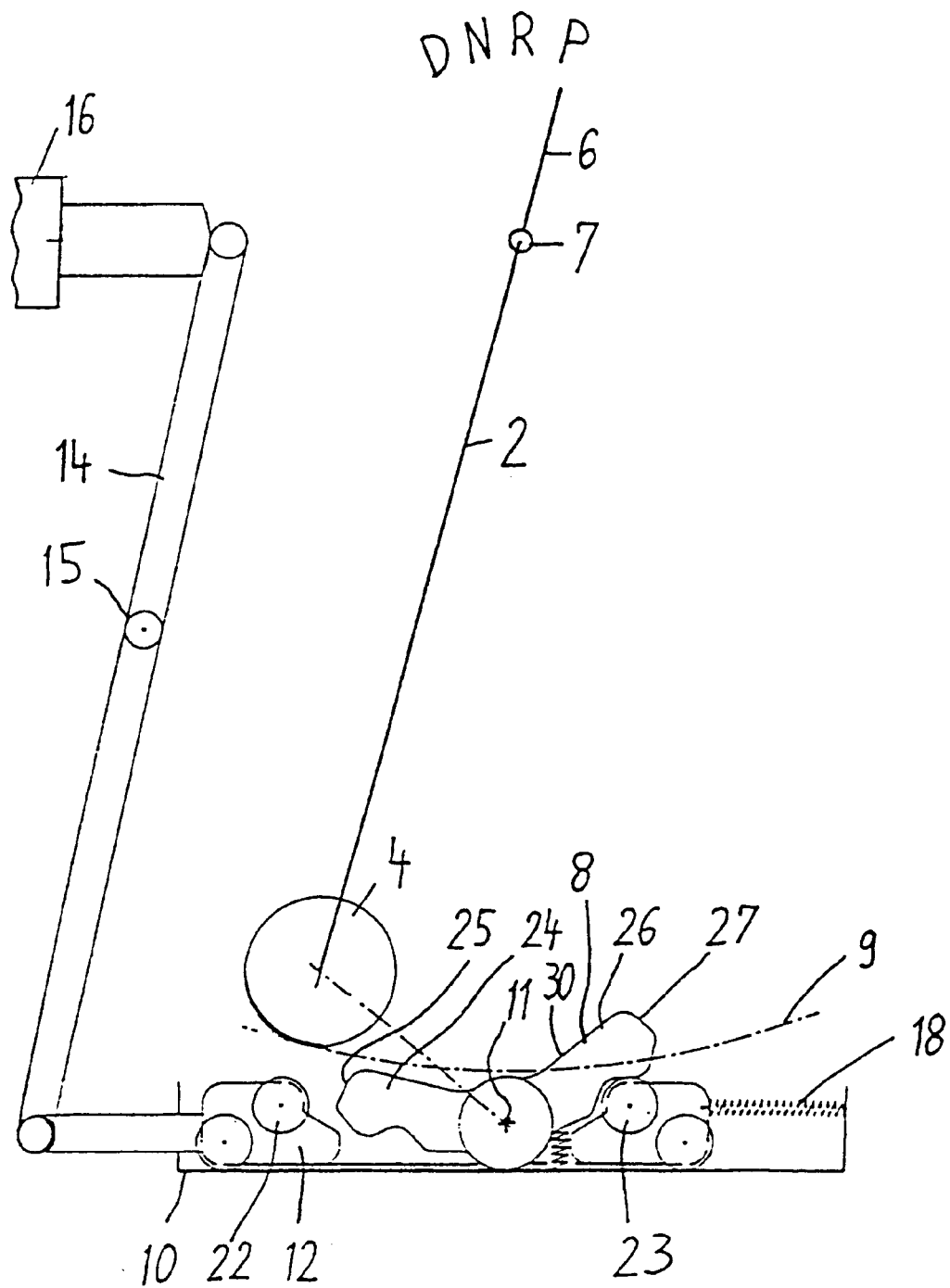

When the electromagnetic control member 16 is switched on, its armature 17 pulls control link 12 by means of positioning lever 14 against the force of tension spring 18 from the right-hand position in FIG. 1 into the left-hand position shown in FIG. 2. The left-hand cam roller 22 disengages from rocker 8 and, instead, the right-hand cam roller 23 below the right rocker arm 26 engages it and pivots it into its upper rocker end position (shown in FIG. 2) while the left-hand rocker arm 24 is simultaneously pivoted into its lower rocker end position.

The latching roller, path of motion, shown schematically in FIG. 1 by a circular path 9 extends so far in the lengthwise direction of rocker 8 that the outer end portion of whichever rocker arm is tilted into the upper rocker end position lies in the path of motion of roller 4, in other words in FIG. 1 the left-hand rocker arm 24 and in FIG. 2 the right-hand rocker arm 26. The free ends 25 and 27 of the two rocker arms 24 and 26 are designed as latching surfaces so that latching roller 4, when it abuts them in the upper rocker end position, cannot be moved in the direction of rotational axis 11 by rocker 8. The latched engagement position of latching roller 4 shown in FIG. 1 with the left-hand rocker arm end 25 is associated with the park position P of selector lever 6. The latching position of latching roller 4, shown in FIG. 7, with the right-hand rocker arm end 27 is associated with the neutral position or the engine idle position N. Positions of latching roller 4 located outside the right-hand rocker arm end 27 are associated with a forward driving position D and possibly additional speeds of the selector lever 6. The position of the latching roller 4 shown in FIGS. 3 and 4 among others, vertically above the rotational axis 11 of the rocker, is associated with the reverse position R of selector lever 6.

A retaining spring 28, which can be a coil spring or another type of spring, is located between one of the two rocker arms 24 and 26 and a bottom of the housing 10. It urges rocker 8 into a central position and is subjected to tensile or compressive stress depending on the tilting movement of the rocker.

Figure 9:
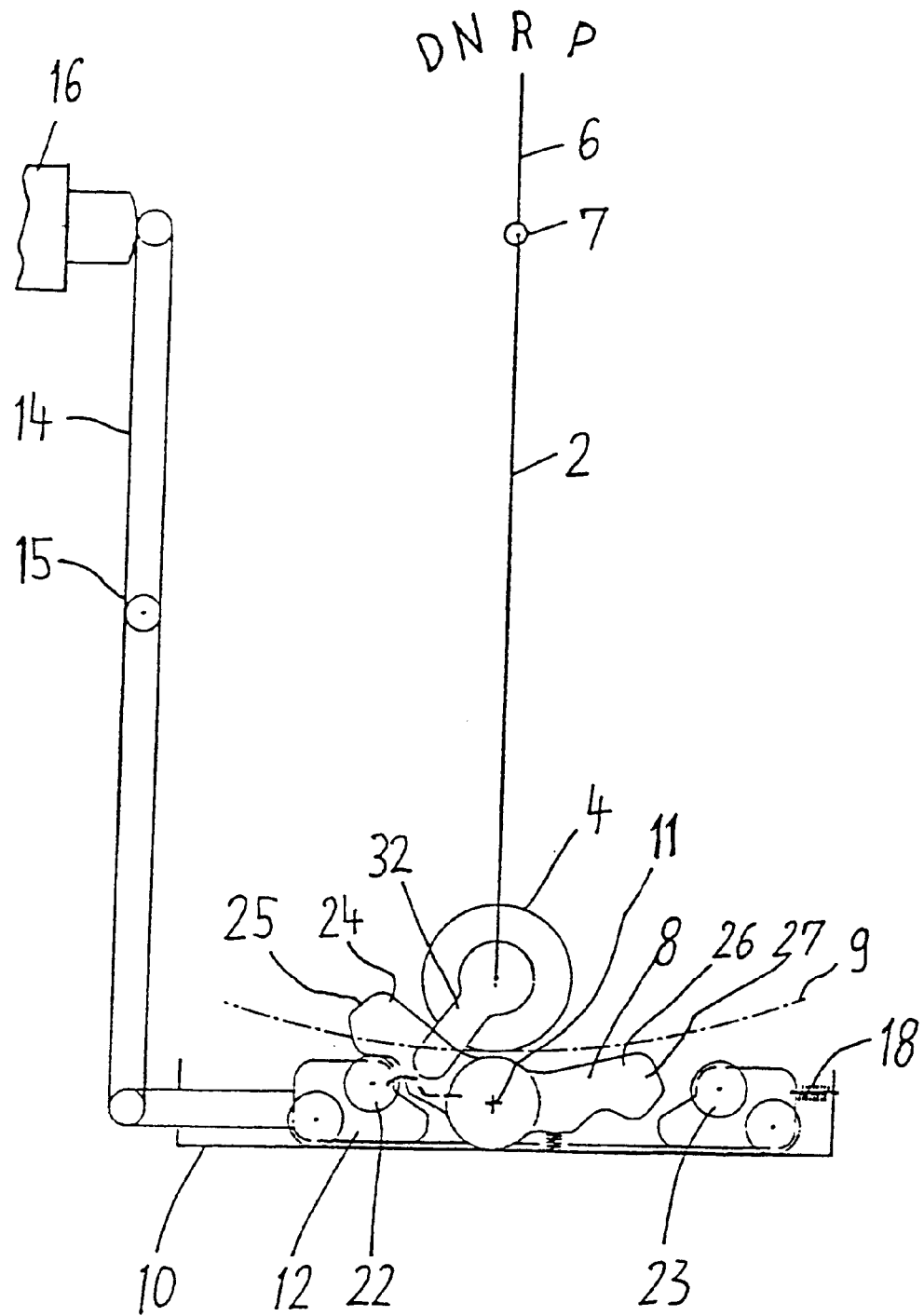
Figure 10:
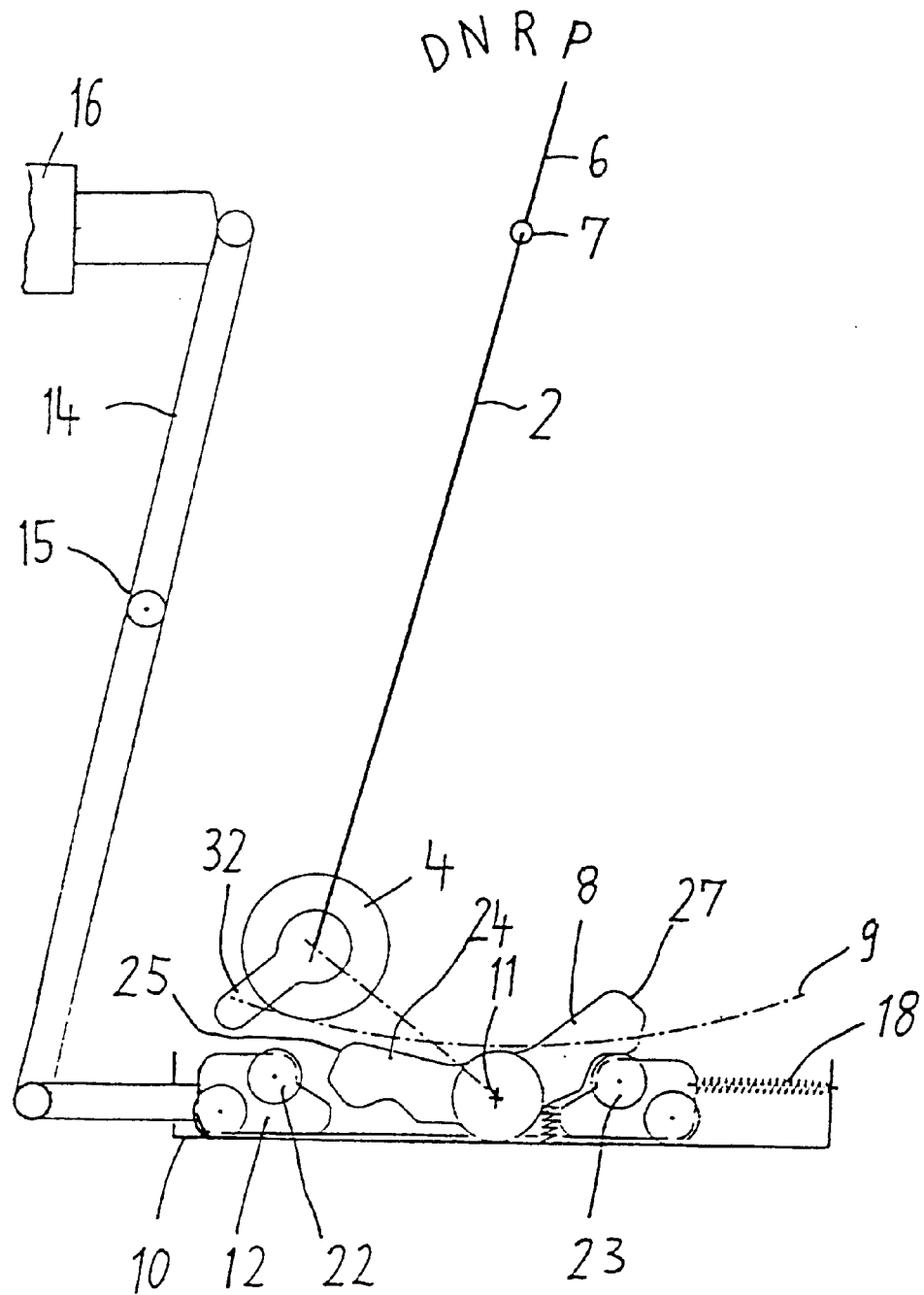

Latching lever 2 of the selector lever 6 has at its lower end a dog 32 for moving the control link 12 from its right-hand position in FIG. 9 into its left-hand position in FIG. 10, when the selector lever pivots from R to P. Latching roller 4 pivots from its position in the middle of the rocker 8 above the rotational axis 11, around the left-hand rocker end 24 to its end 25, while this left-hand rocker end 25 is moved by dog 32 by means of control link 12 from its upwardly pivoted rocker end position into its lower rocker end position. Dog 32 is designed so that it releases control link 12 shortly before P so that moves backward rapidly under the force of tension spring 18 and the selector lever 6 latches in P. Thus the selector device 1 is returned to the situation in FIG. 1. Dog 32 moves freely in the opposite direction so that it cannot engage control link 12 in the opposite direction.

The function of the selector device in FIGS. 1 to 10 is described theoretically in the following Table 1:

TABLE 1

| FIG. | Function | Rocker Position | Link | Magnet | Selector Lever Position |
|---|---|---|---|---|---|
| 1 | P blocked | right | right | no current | P |
| 2 | P released | left | left | current on | P |
| 3 | shift from P to R | left | left | current on | R |
| 4 | reach R | right | right | no current | R |
| 5 | shift through N to D | riqht | right | no current | D |
| 6 | D/N to R blocked | left | left | current on | D |
| 7 | N blocked | left | left | current on | N |
| * | shift from D/N to R | right | right | no current | R |
| 9 | shift from R to P | right | right | no current | shortly before P |
| 10 | reach P | left | left | no current | P |

The figures of Table 1 are described in the following.

FIG. 1: Rocker blocks forward movement of selector lever from P to R (P latch). Rocker in right-hand tilted position (right-hand rocker arm down).

FIG. 2: Magnet moves link to the left. Rocker tilts into the left-hand tilted position (left-hand rocker arm down) and releases position P.

Figure 3:
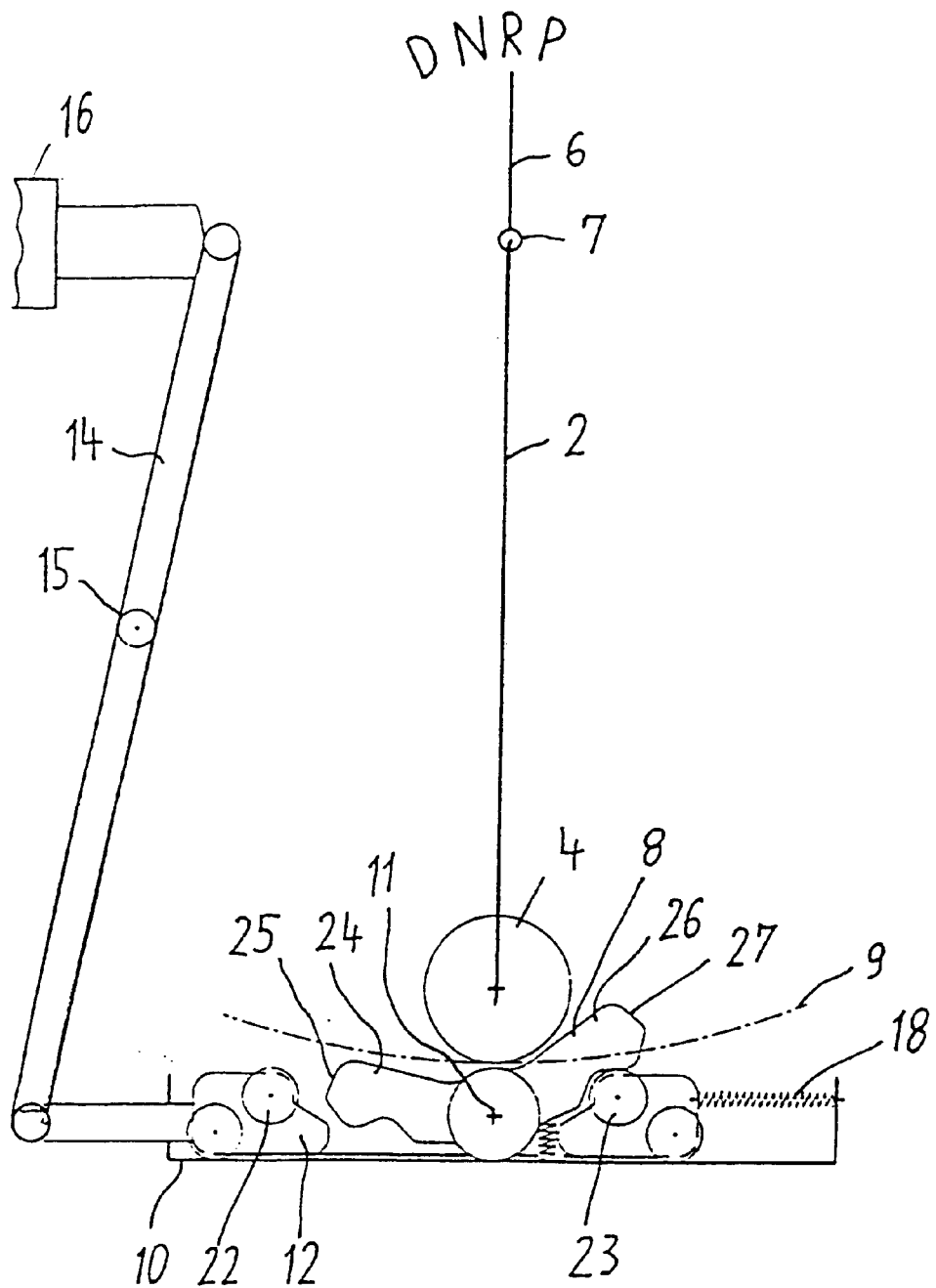

FIG. 3 : Selector lever pivots from P to R.

Figure 4:
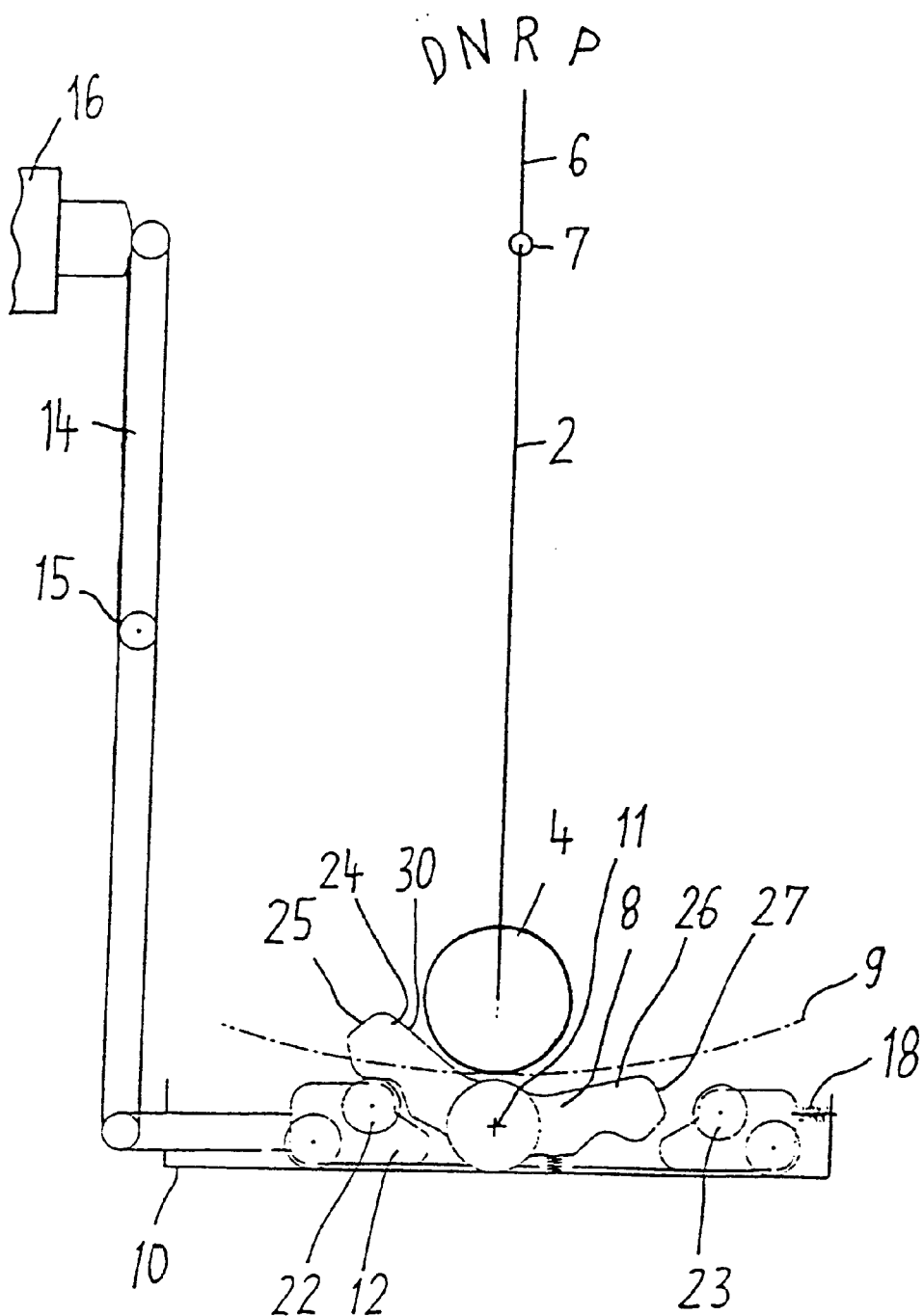

FIG. 4: During the pivoting from P to R, the energization of the magnet is interrupted. The positioning spring moves the link into the right-hand position. The rocker tilts into the right-hand tilted position.

Figure 5:
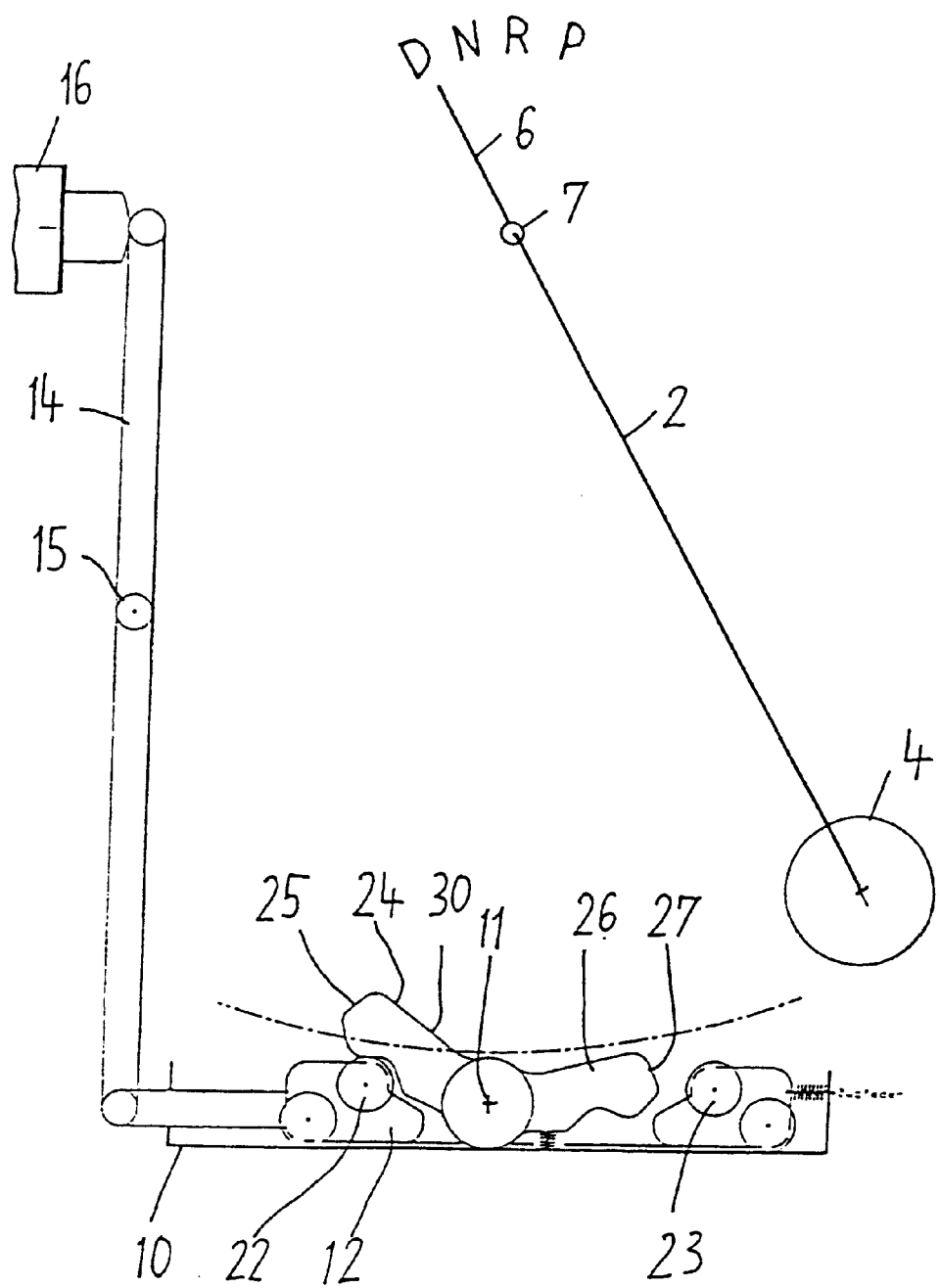

FIG. 5: Selector lever pivots freely into position D. Selector lever can pivot backward unimpeded from D through N into R as long as the vehicle speed is zero or less than another limiting value, for example 8 km/h.

Figure 6:
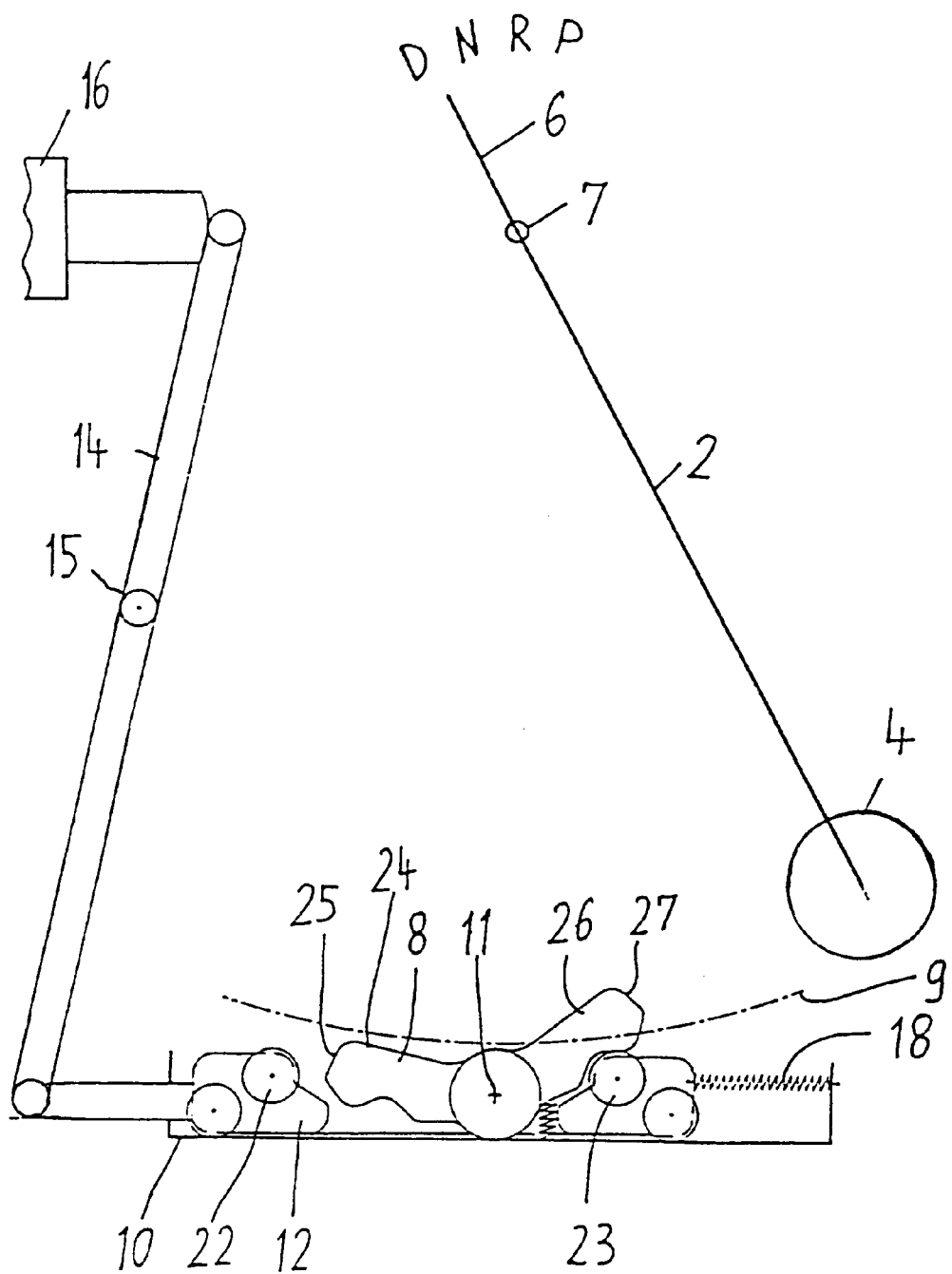

FIG. 6: Above the limiting speed value, 8 km/h for example, the magnet is actuated. The magnet moves the link to the left. The rocker tilts into the left-hand tilted position. The latching function operates from N to R® latch).

Figure 7:
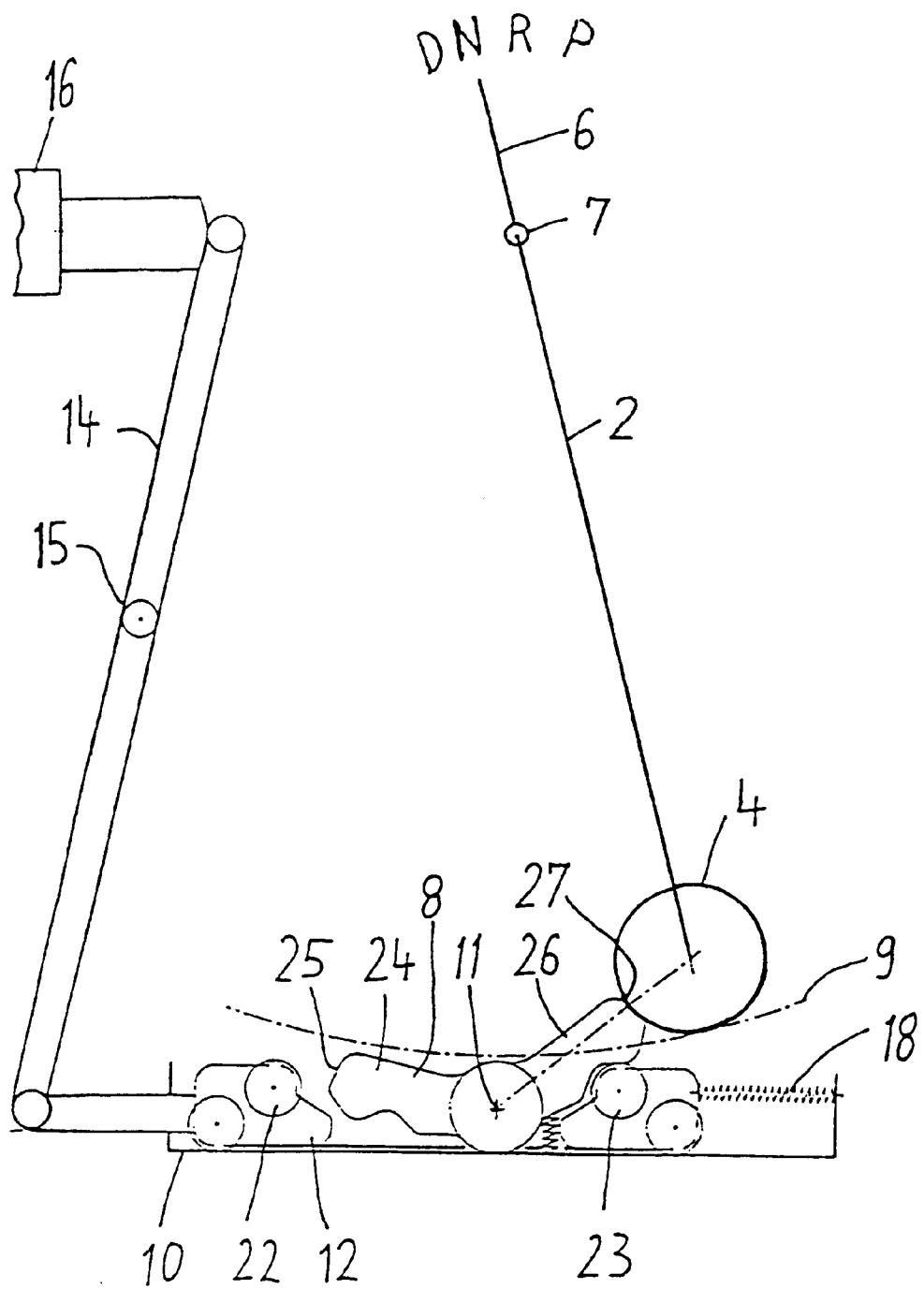

FIG. 7: Latch blocks backward movement of selector lever from N to R® latch).

Figure 8:
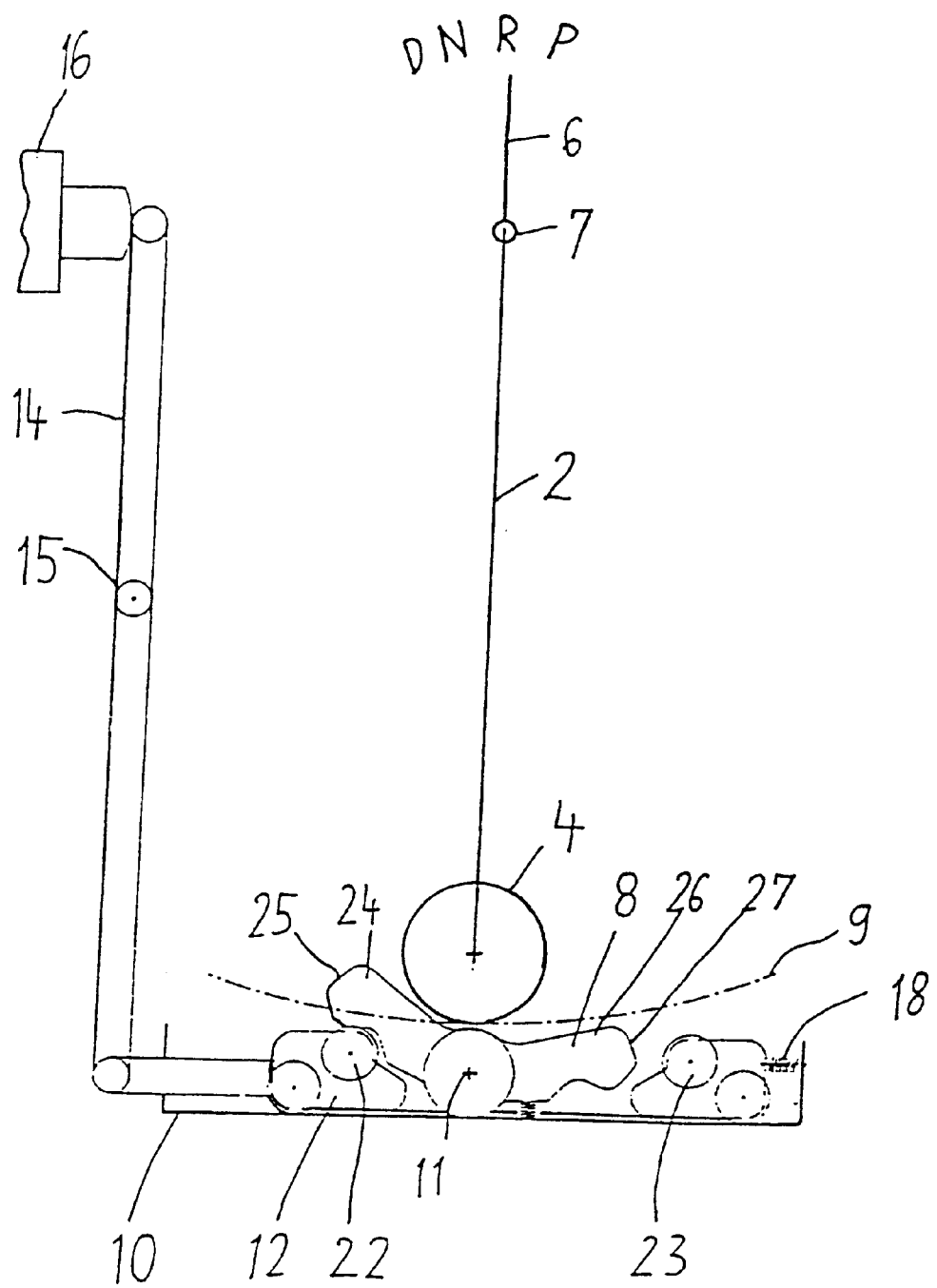

FIG. 8: After falling below the limiting speed value, for example 8 km/h, the magnet releases the rocker. The positioning spring moves the link to the right and the rocker into the right-hand tilted position. The rocker releases the selector lever. The selector lever pivots from N to R.

FIG. 9: On the path of the selector lever from R to P, the dog on the selector lever moves the link from right to left. Position P is reached passively without energizing the magnet.

FIG. 10: The dog is designed so that it releases the link shortly before P, so that the link returns and blocks P, and thus is reset to the position corresponding to FIG. 1.

The use of rocker 8 with a latching control link 12 located beneath it permits operationally safe latching and unlatching of selector lever 6. The latching link 12 is displaced beneath the rocker in the lengthwise direction of the rocker by a tension spring 18 and electromagnetic control member 16. As a result, the one element, namely the rocker 8 and the latching roller 4, which provide the latching action, is separated from the other element, namely the latching link 12, in which loads are incurred during the actuation by the tension spring 18 and the electromagnetic control member 16. This has the advantage that only small forces of the tension spring 18 or the electromagnetic control member 16 are required to tear free the latch (P latch and R latch) between latching roller 4 and rocker ends 25 and 27 because the principal load of the latching forces is supported in the fixed mount 13 (see FIG. 11 for example) of rocker 8. Only a small portion of the latching load forces must therefore be overcome by actuators 16 and 18, especially by electromagnetic control member 16. Another advantage of this system is that it is insensitive to tolerances since the exact tilt of rocker 8 and hence the position and dimensions of the control links are unimportant for the latching function. Only the left-hand and right-end stop provided by the right-end and left-hand ends 25 and 27 of the rocker and the position of the rocker rotational axis 11 must be designed exactly. The motion paths of the latching window and/or the control link 12 can be defined in simple fashion by fixed stops on housing 10. The stops can be located in a specific motion path of control link 12 and cooperate directly with it or can be located in the path of motion of control lever 14 or magnet armature 17. Such stops avoid strict requirements for the accuracy of the individual parts of the selector.

Surface 30 of rocker 8 is designed with its two rocker arms 24 and 26 as a control curve on which the latching roller 4 can roll.

Instead of a latching roller 4 on latching lever 2, it is contemplated that latching rollers 4 can be rotatably mounted on each of the free ends of rocker arms 24 and 26, on which rollers the lower end of latching lever 2 can be brought into the latching position. Tension spring 18 can be replaced by a compression spring located opposite on control link 12. Instead of a pivotably mounted selector lever 6, a linearly displaceable selector element can also be used. Instead of latching rollers 4 on latching lever 2 or on the rocker arms 24 and 26, non-rotating stop surfaces can also be used. The disadvantage is that frictional forces are involved instead of rolling forces. Such non-rotating stop surfaces can preferably be made in the form of a convex curve in their direction of movement so that following an initial movement from their latched engagement position in the direction of their disengagement position, by a manual force on selector lever 6, can already be pushed past one another if they are not yet in position so that they are completely out of engagement with one another. The various embodiments described with reference to this embodiment also apply to the embodiment described below and vice versa.

In the following, the embodiment shown in FIGS. 11 to 31 will be described. It also meets the requirement that even with higher actuating forces on the manual selector element, it is still possible to tear the latch free from the park position P into the reverse position R and/or to block a move from the neutral position N into the reverse position R. Parts of this second embodiment which, in terms of principle has the same function as parts of the first embodiment, have been provided with the same reference numerals increased by 100.

In the second embodiment according to FIGS. 11 to 30, a selector lever 102 nonrotatably connected with a selector lever 106 is pivoted with its lower end designed as a latching part 104 along the illustrated circular path 109 when the selector lever 106 is moved manually along its positions P, R, N, and D. A rocker 108 is provided as a latching element, said rocker being mounted in a housing 110 to rotate around a fixed rotational axis 111. Rocker 108 is actuated by an electromagnetic control member 116 against the force of a positioning spring 118 by a two-armed rocker lever or control lever 114 that can be pivoted around a fixed rotational axis 115. Provided the electromagnetic control member 16 has not been switched on, in other words not supplied with current, the position of rocker 108 is secured by the positioning spring, for example a compression spring 118.

The spring 118 presses an actuating surface 140 of the left rocker arm 124 against the lower control lever arm 142. The lower end of the lower lever arm 142 can slide on the actuating surface 140. To reduce the frictional resistance, one of the two parts that are in contact with one another can be replaced by a roller. With electrical control member 116 switched off, rocker 108 is tilted clockwise so that its left rocker arm 124 is in an upper rocker end position and its right rocker arm 126 is in a lower rocker end position.

The free end of the left rocker arm 124 urged into the upper rocker end position by compression spring 118 is formed by a locking roller 125 freely rotatably mounted therein, on which latching part 104 of latching lever 102 can be brought into a latched engagement position. By energizing the electromagnetic control member 116, which is controlled by an electronic control device 19, the left rocker 124 provided with latching roller 125 is pushed downward to the point where latching roller 125 and latching part 104 are either moved completely out of engagement, preferably into an unlatched engagement position, in which the latching part 104 can be pressed by manual force on selector lever 106 against latching roller 125 such that it rides on this roller and pushes it away in a downward direction. As described above with reference to the first embodiment, latching part 104 of latching lever 102 can be formed by a latching roller or instead, the free end of left-hand rocker arm 124 can be in the form of an end that serves as a latching surface. The same interchangeability of parts is obtained for the free end of the rocker arm 126 shown at the right in FIGS. 11 to 29 and its end 127 designed as a latching surface for latching part 104. The upper surface 130 of the rocker is made as a control curve over its entire length, by which latching part 104 of latching lever 102 moves away. The individual positions of latching part 104 relative to rocker 108 are each assigned to specific positions P, R, N, and D of selector lever 106.

Figure 11:
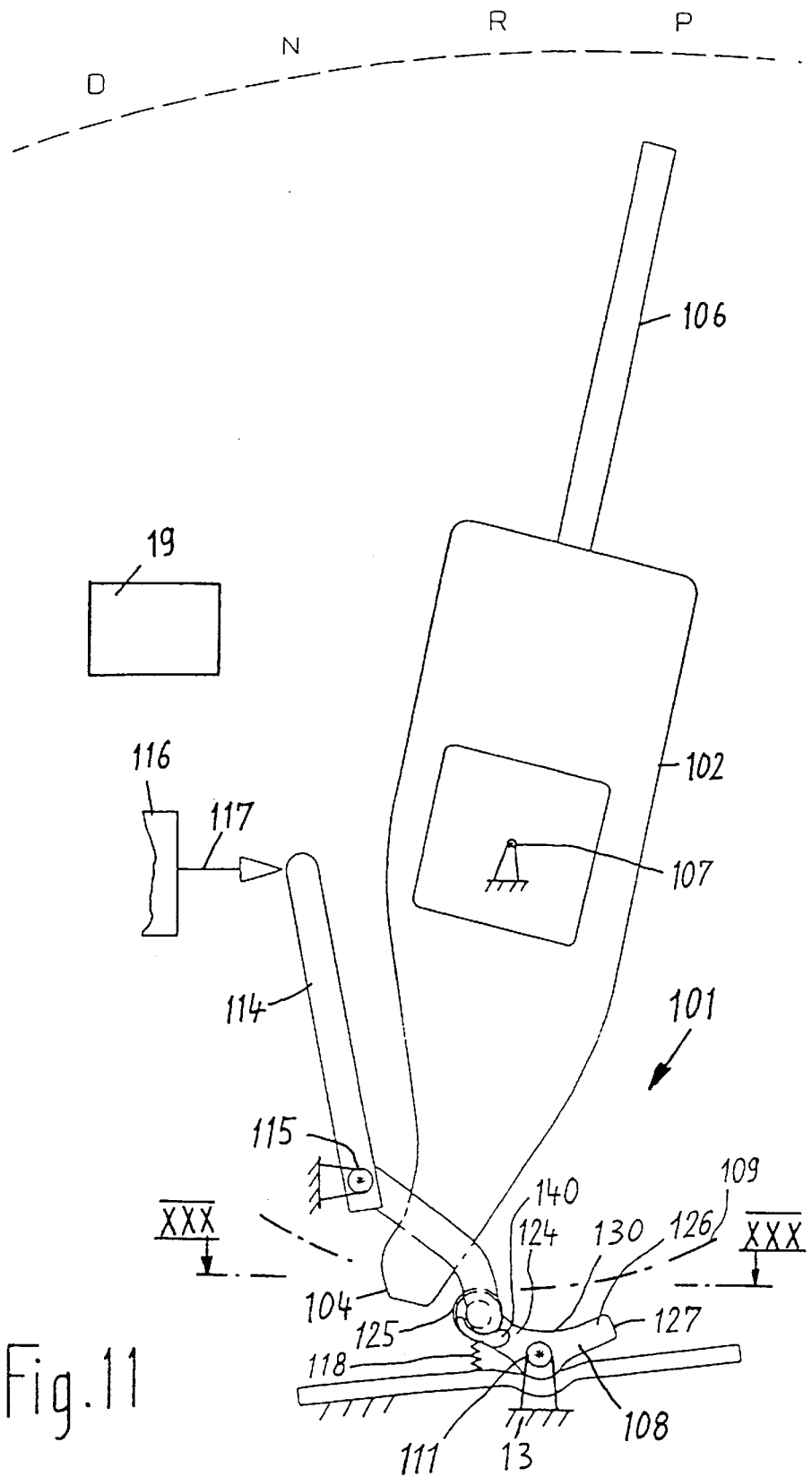
FIGS. 11 to 29 are schematic side views of a second embodiment of a selector according to the invention in various positions that are described below in Table II.
Figure 12:
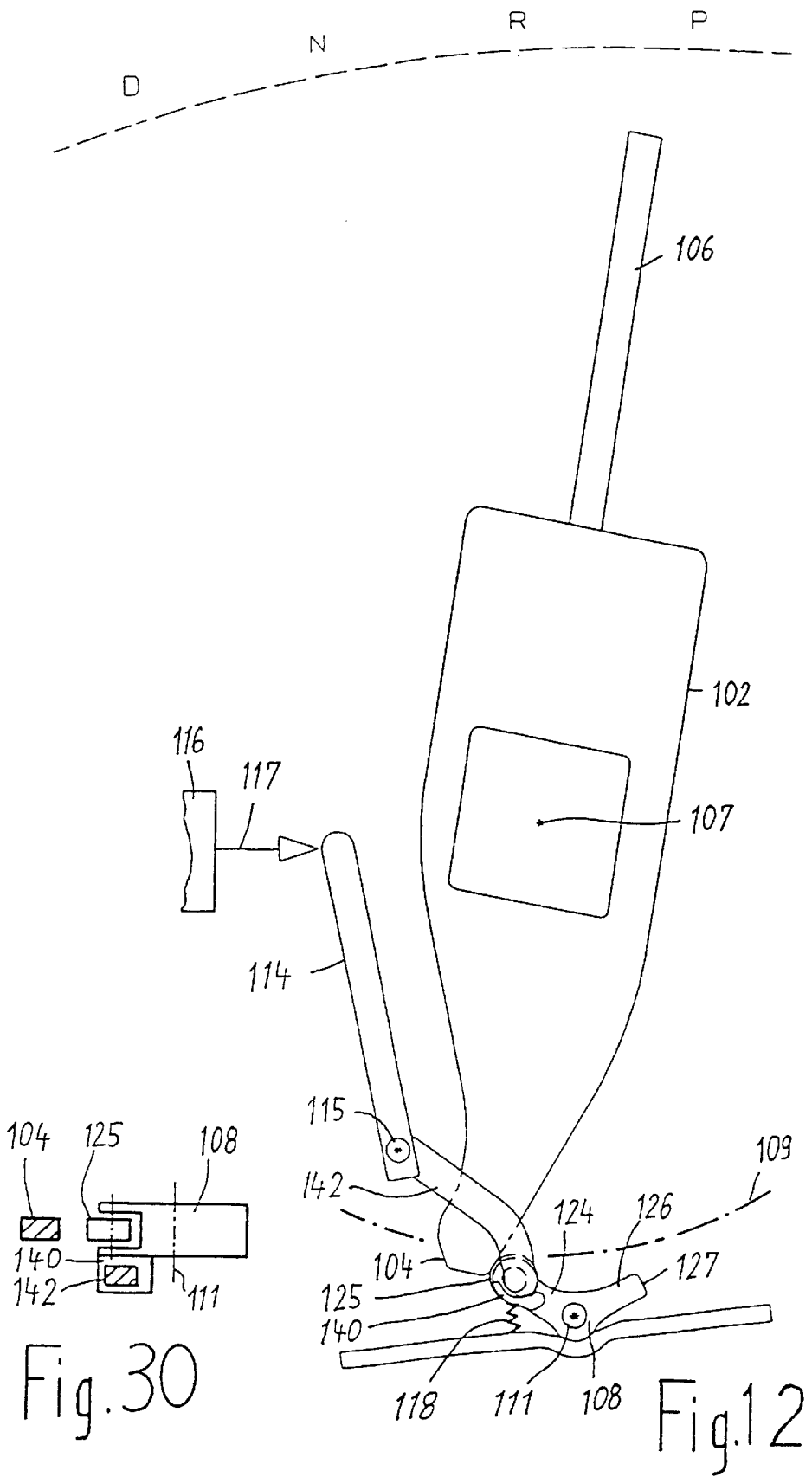
Figure 13:
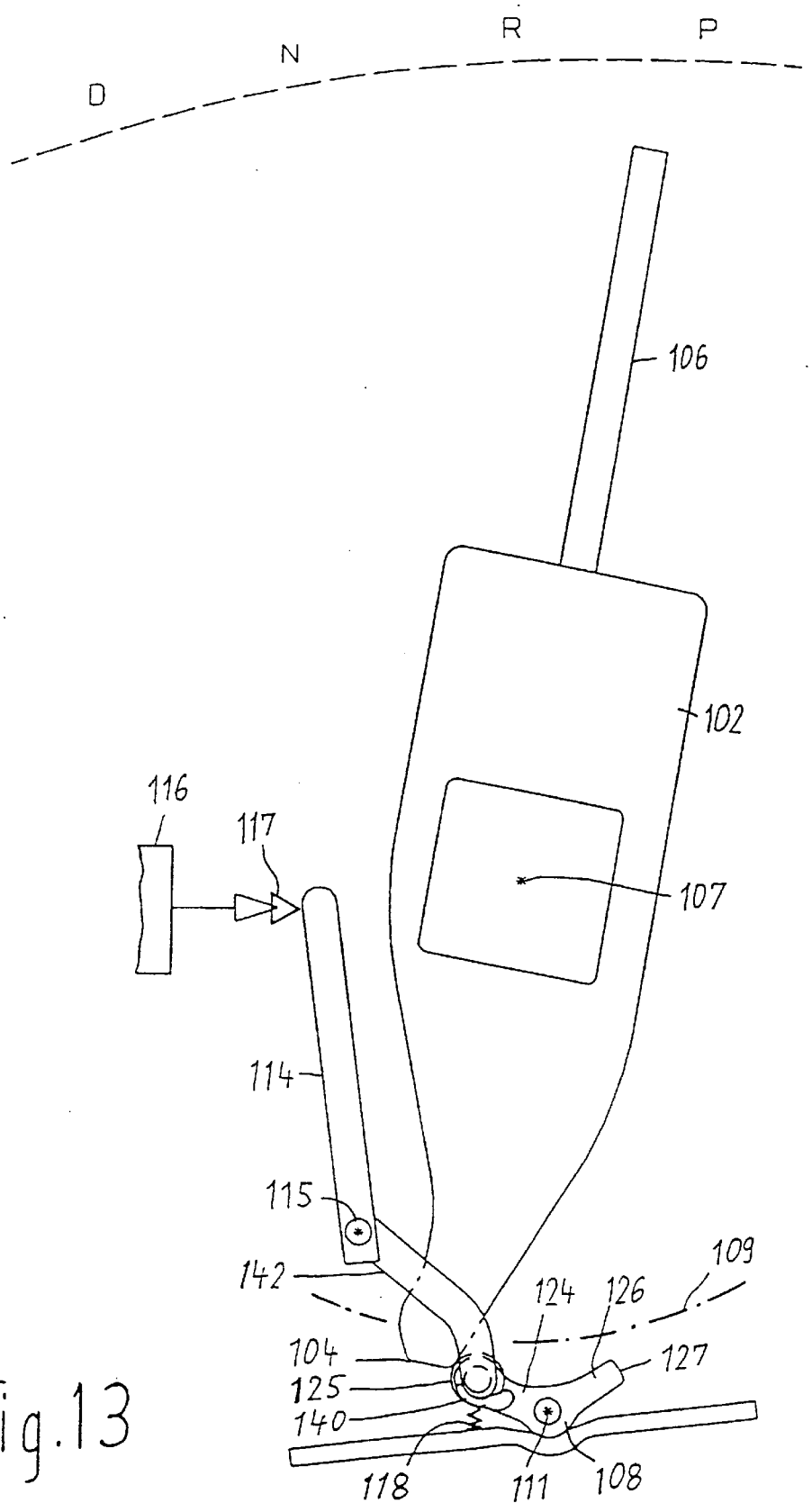
Figure 14:
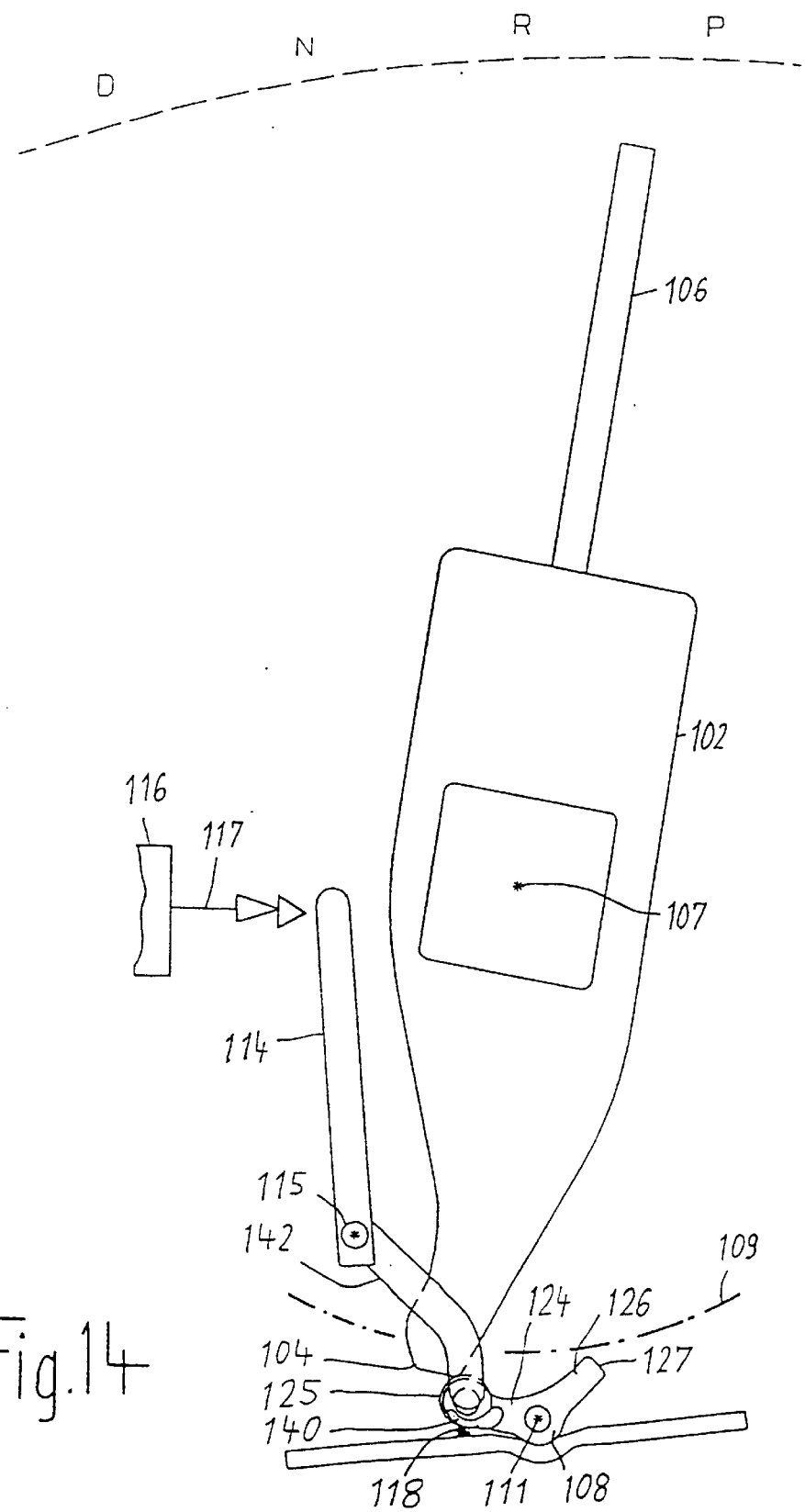
Figure 15:
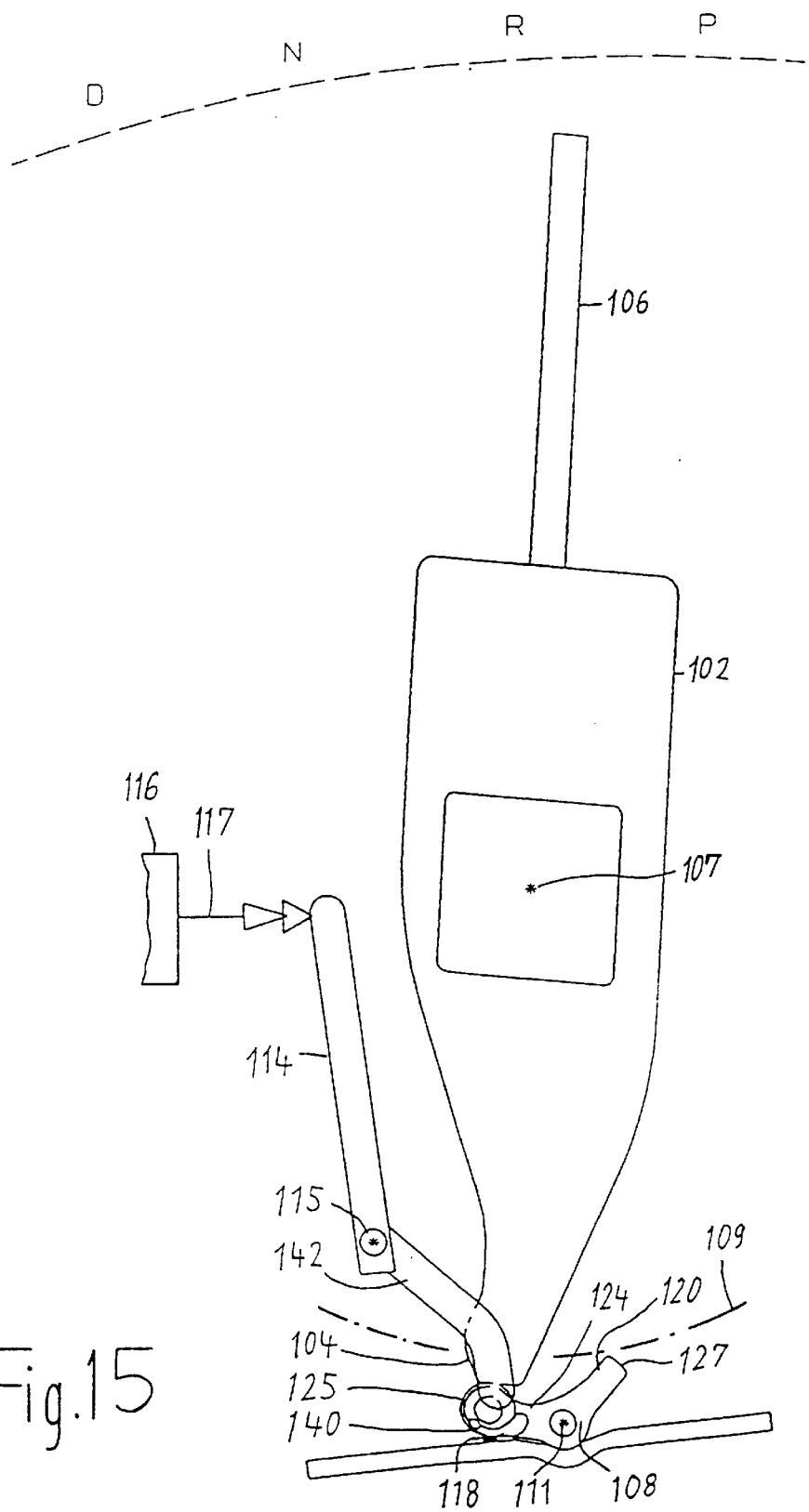
Figure 16:
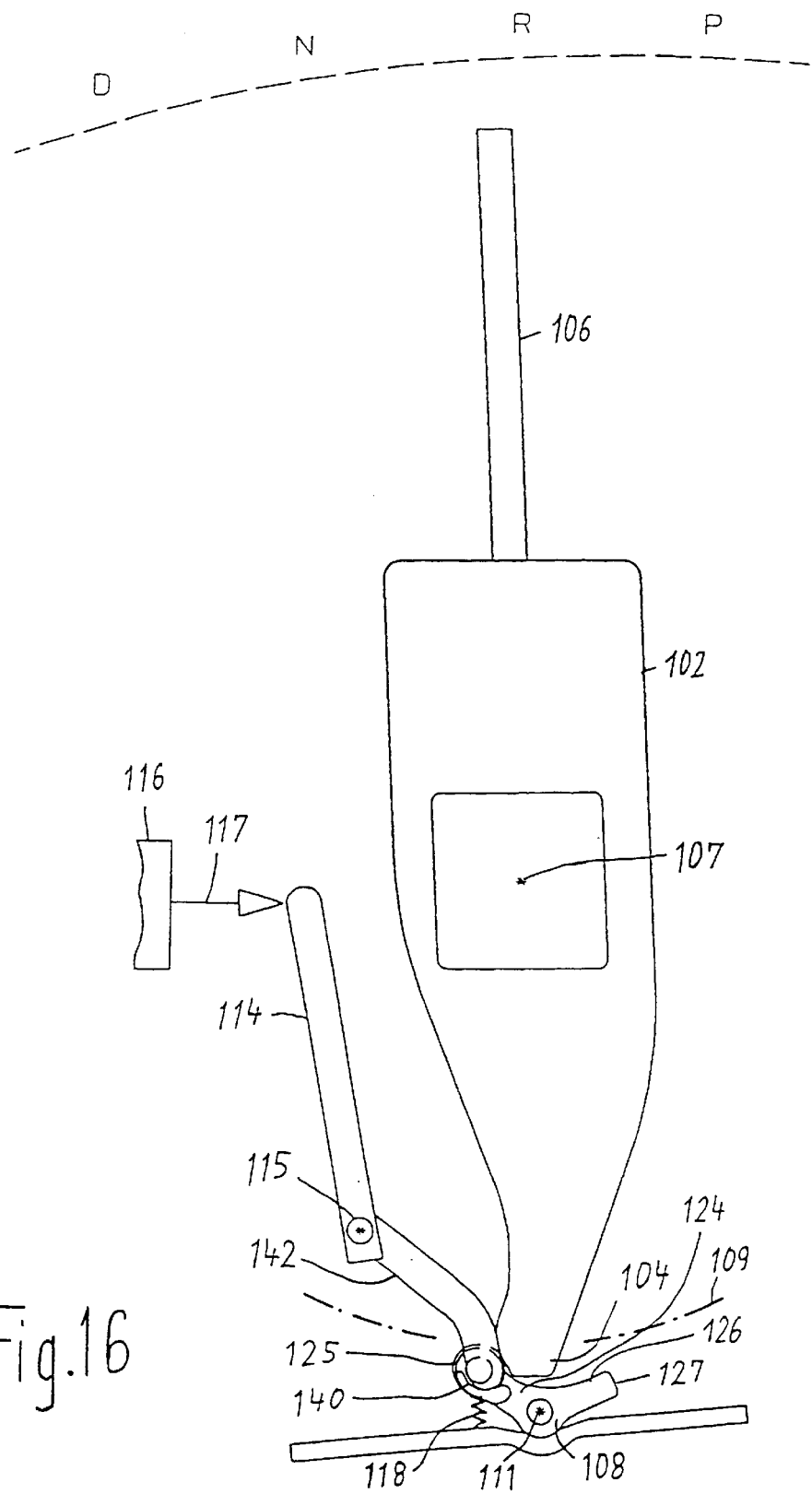
Figure 17:
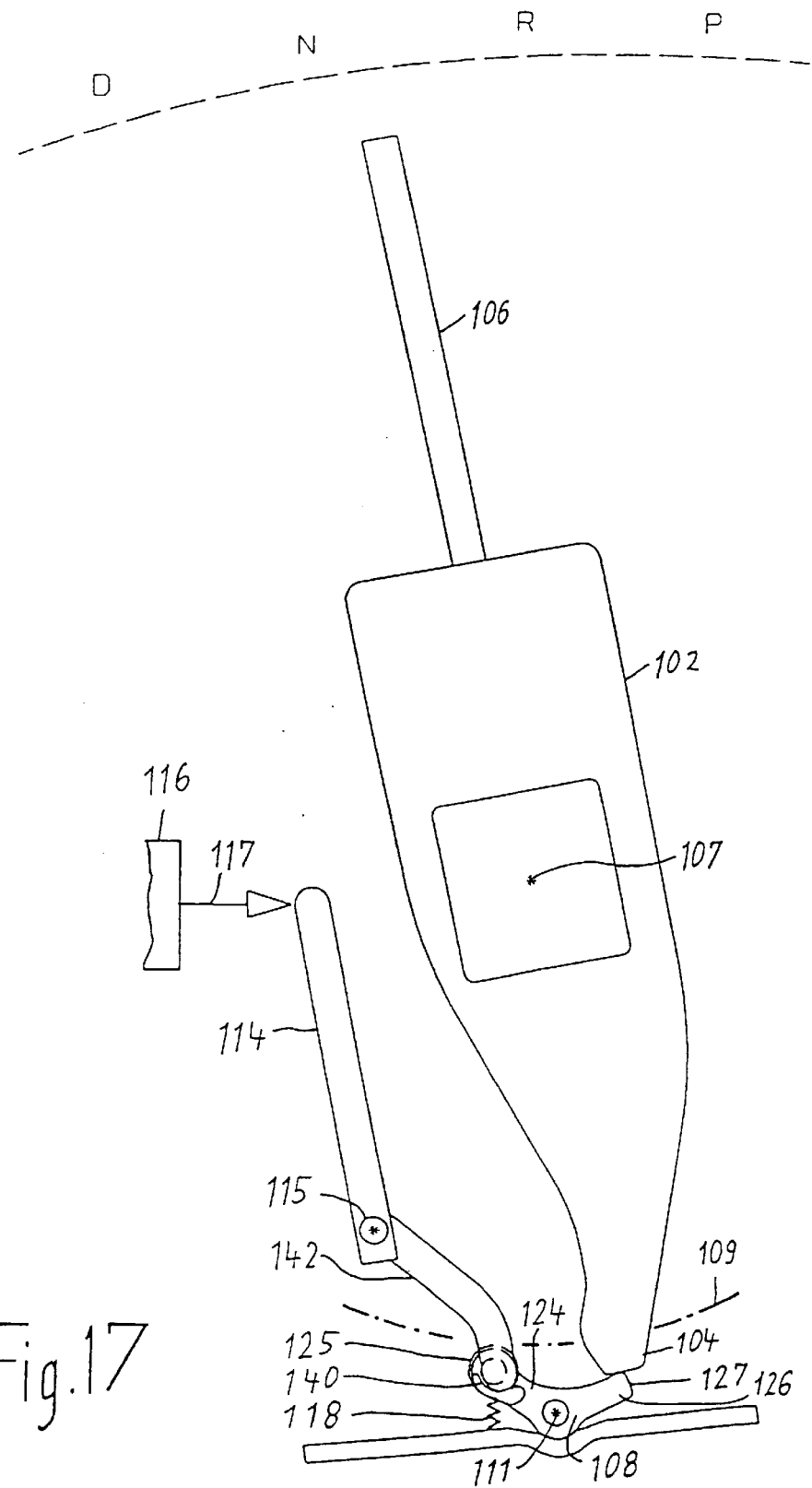
Figure 18:
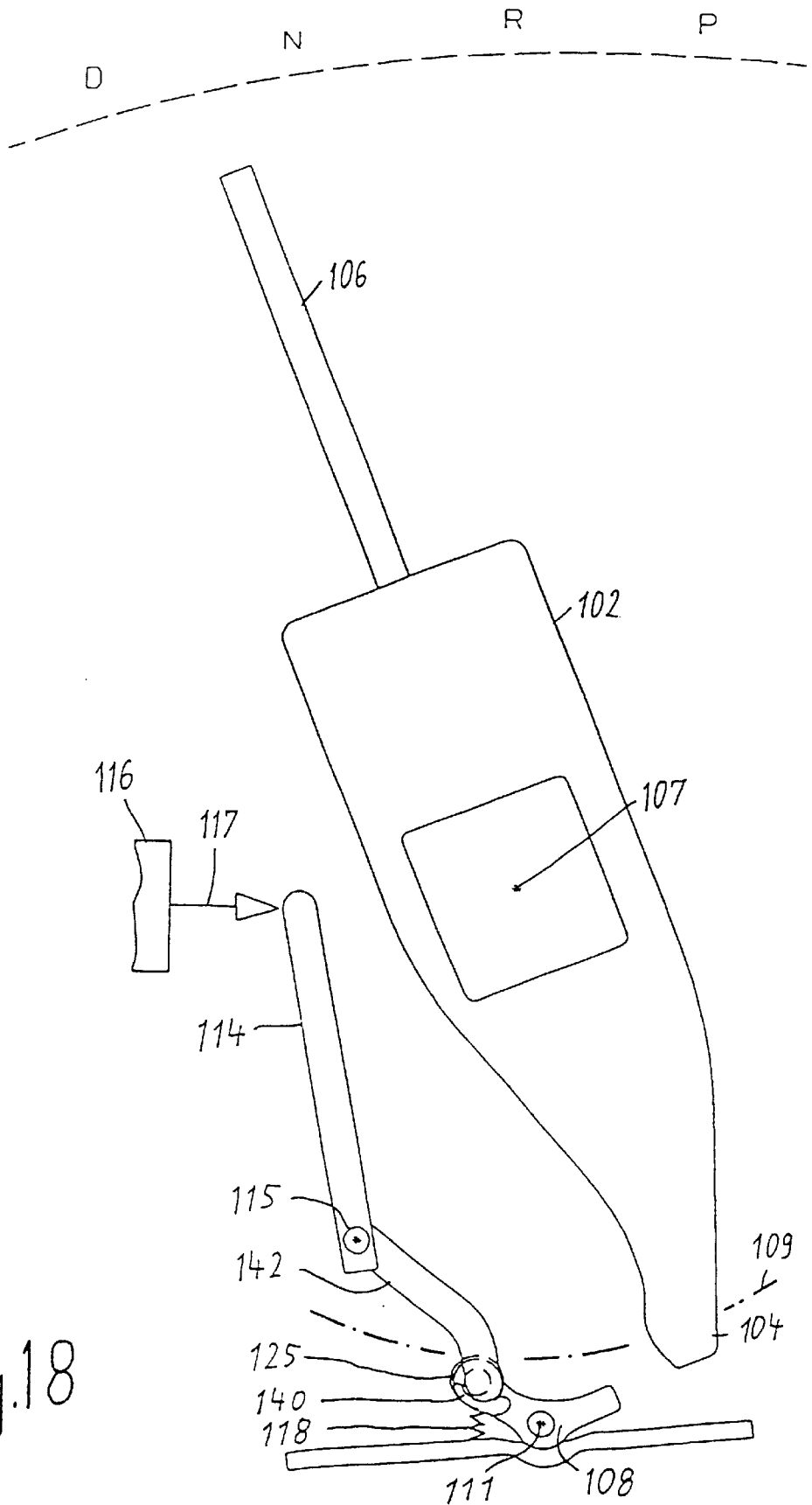
Figure 19:
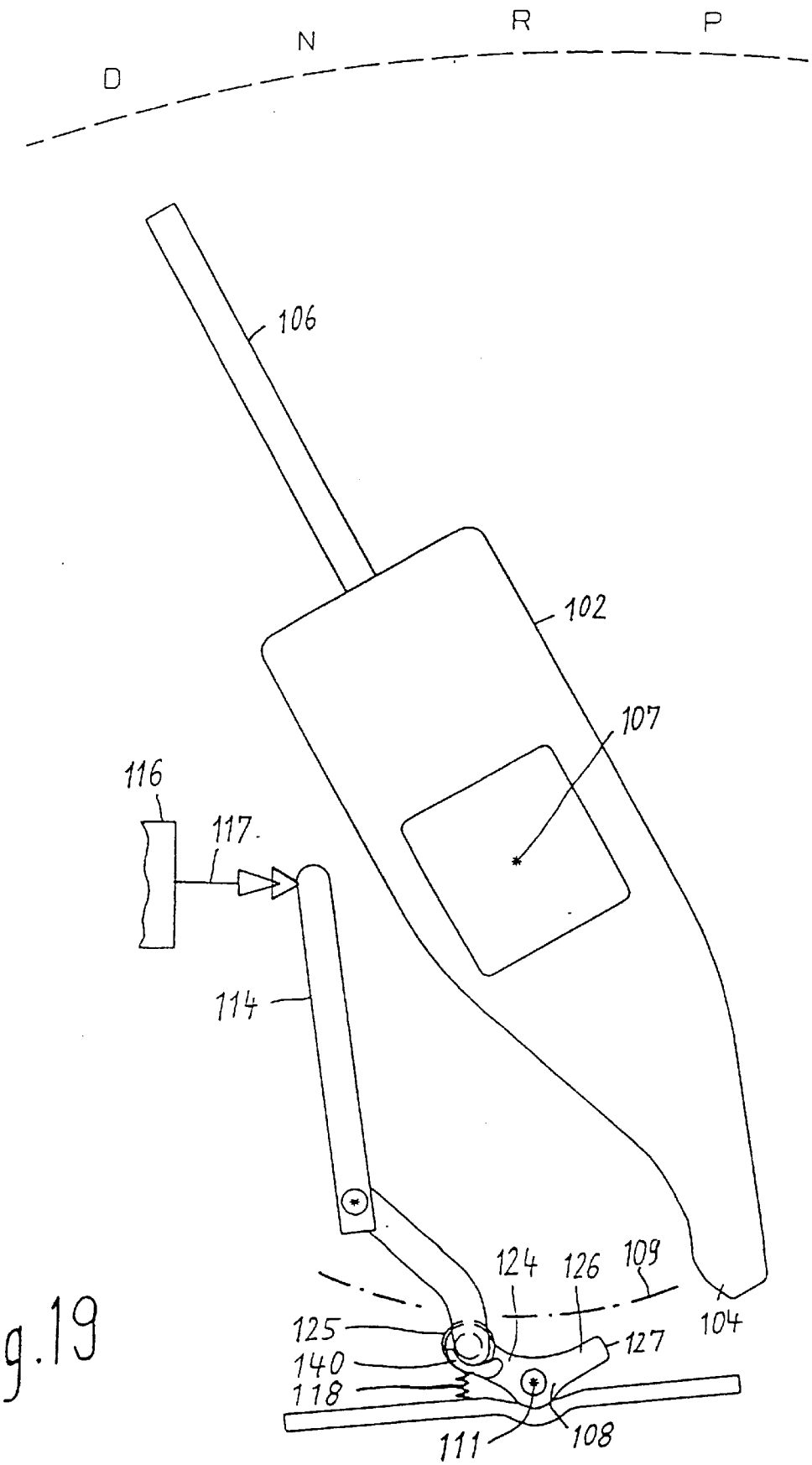
Figure 20:
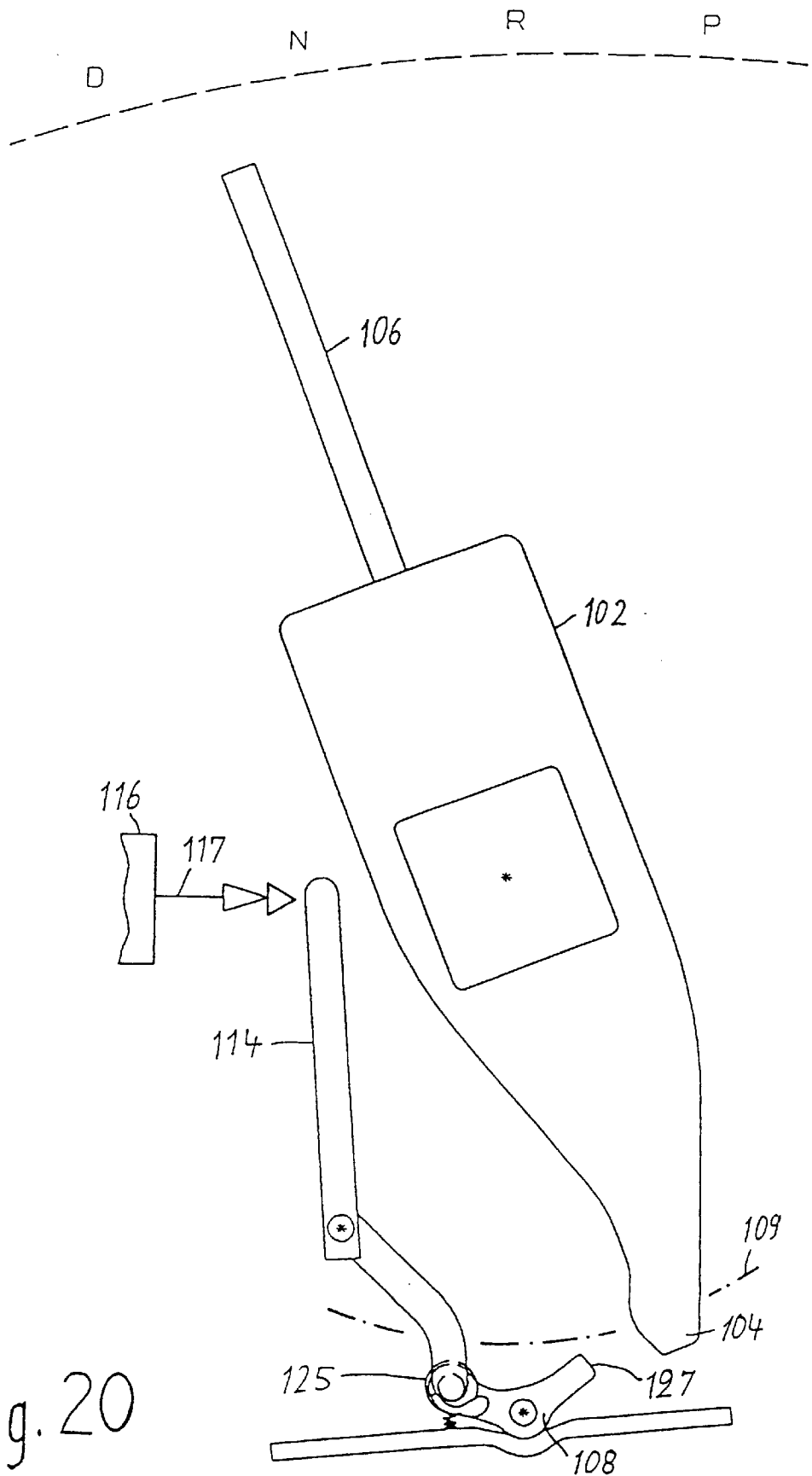
Figure 21:
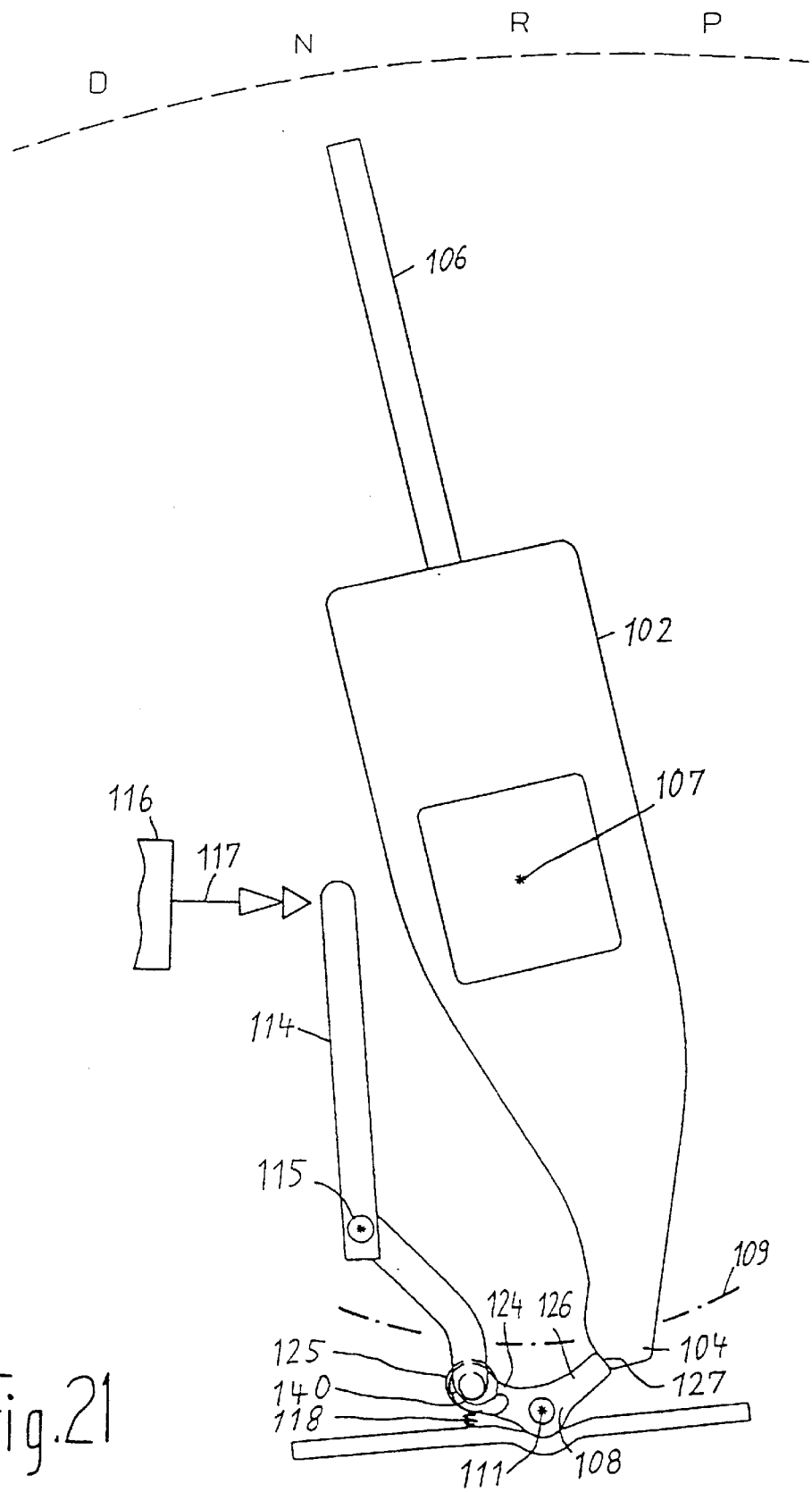
Figure 22:
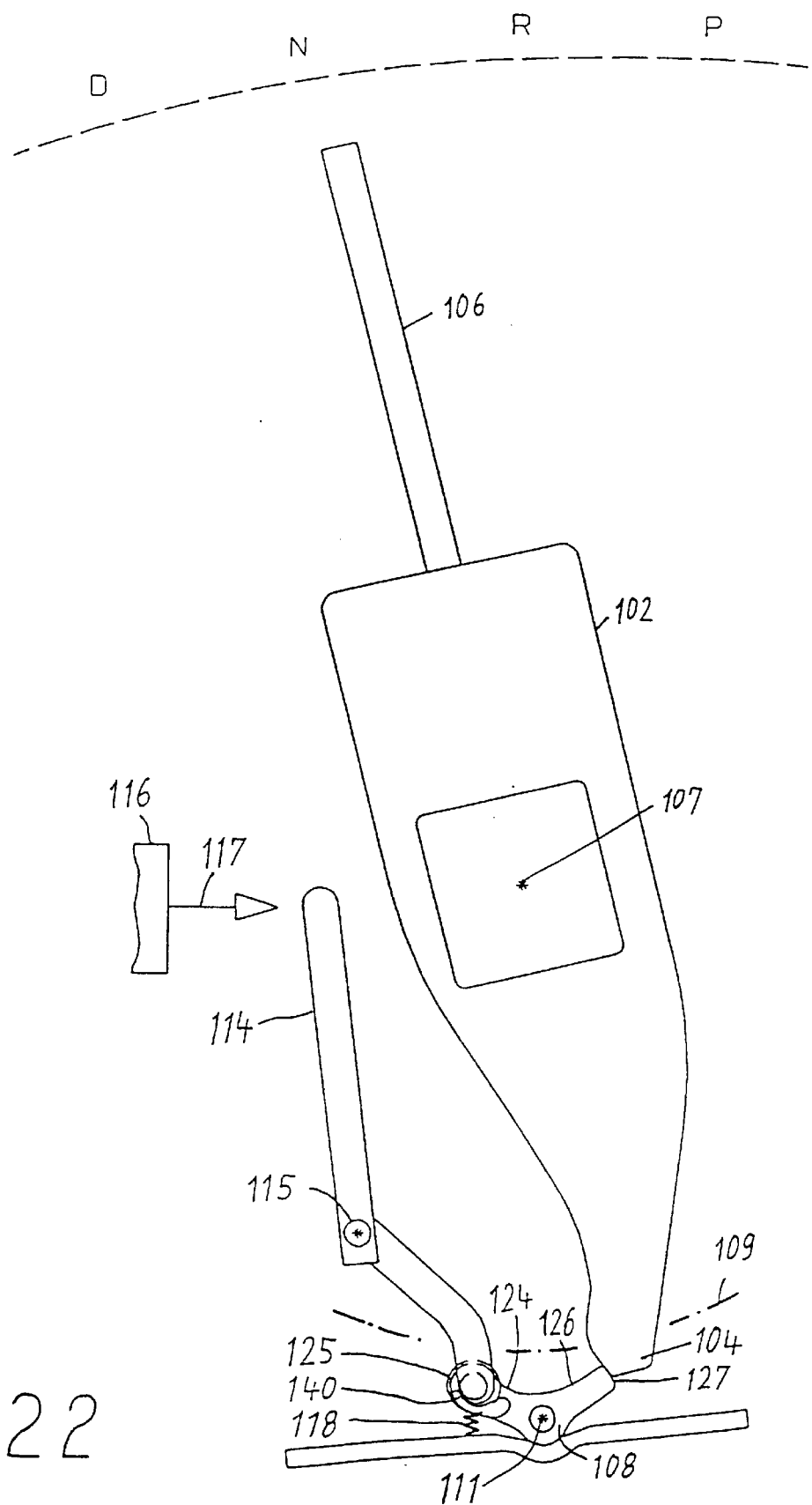
Figure 23:
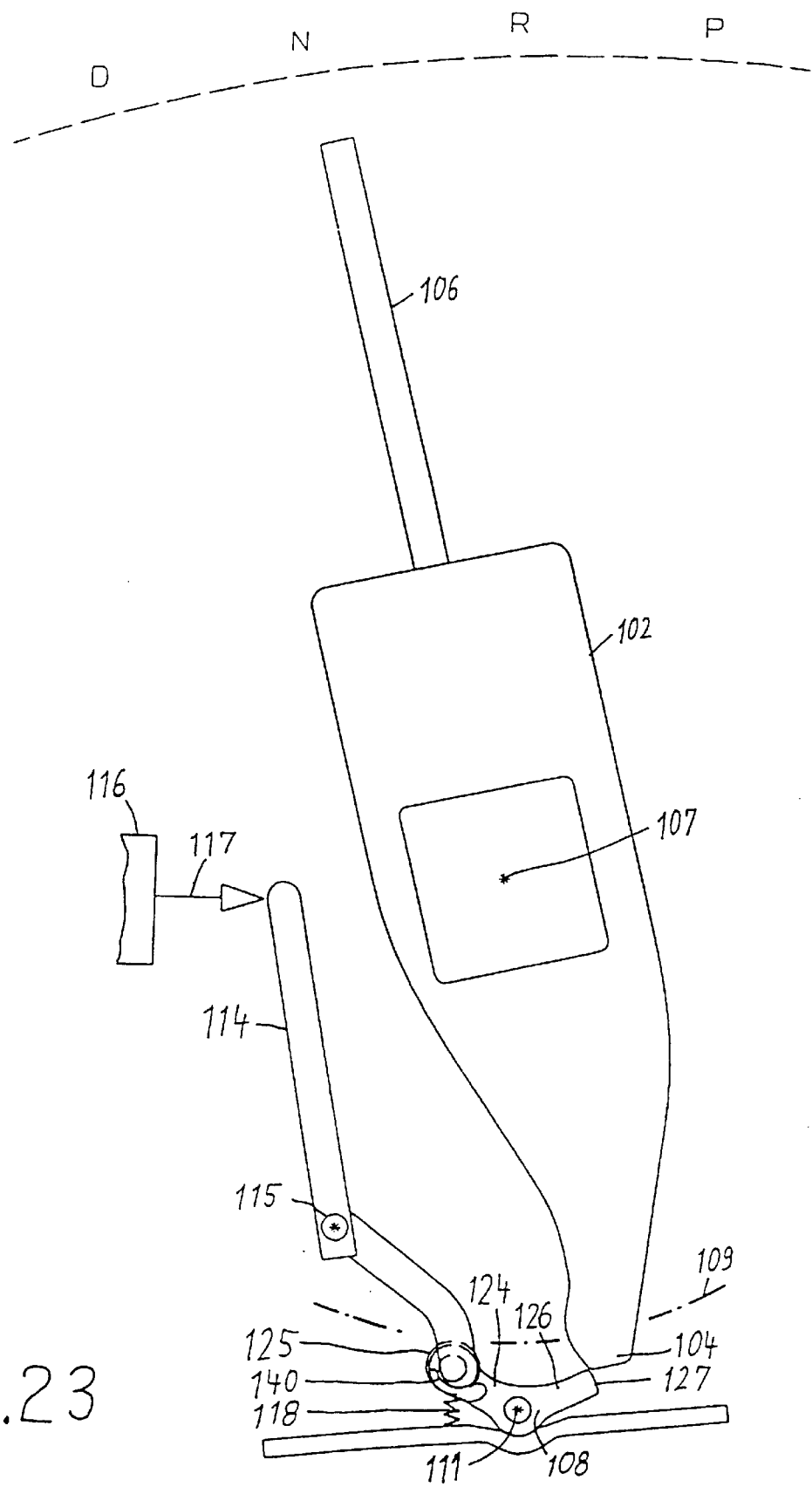
Figure 24:
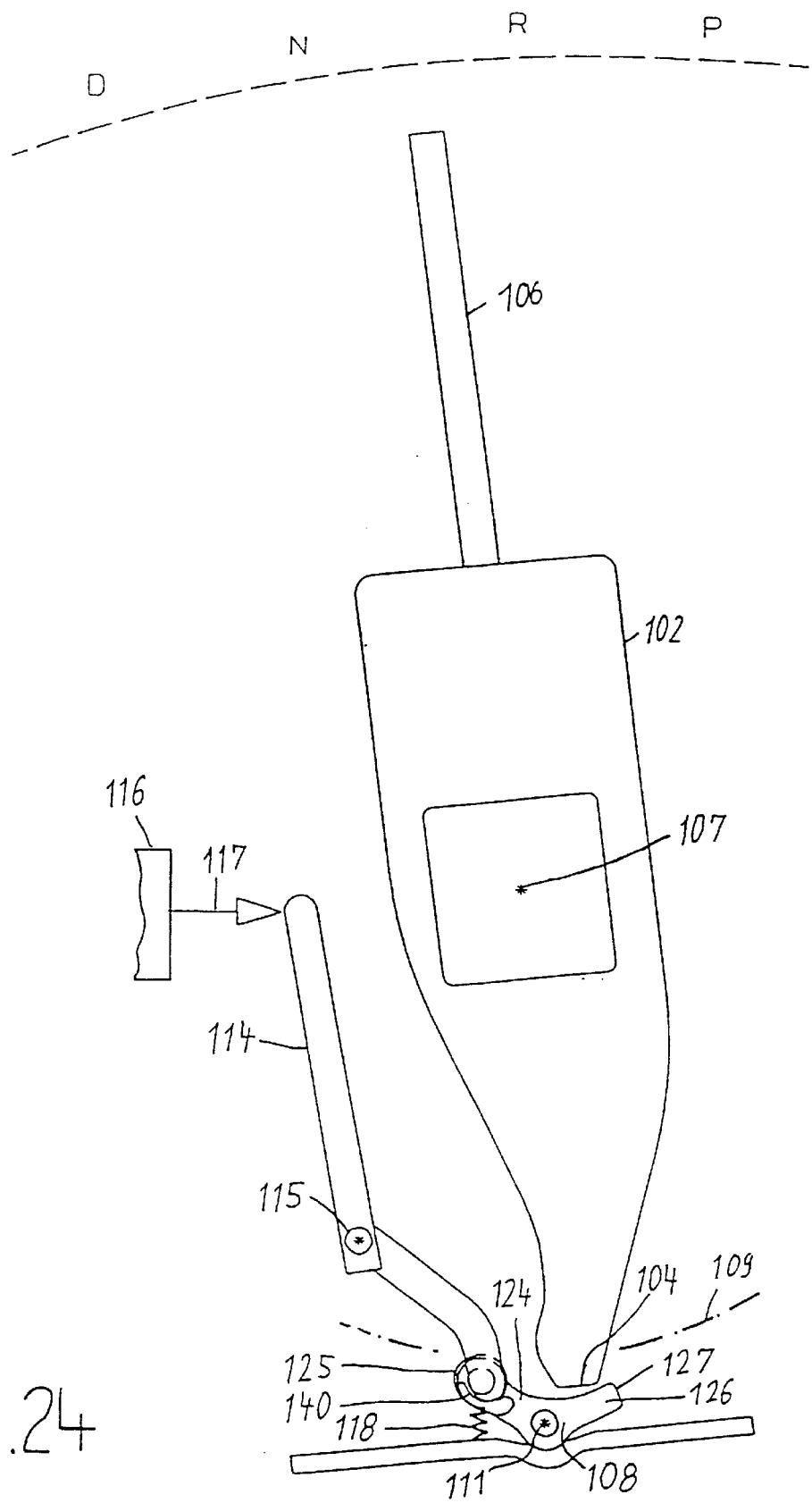
Figure 25:
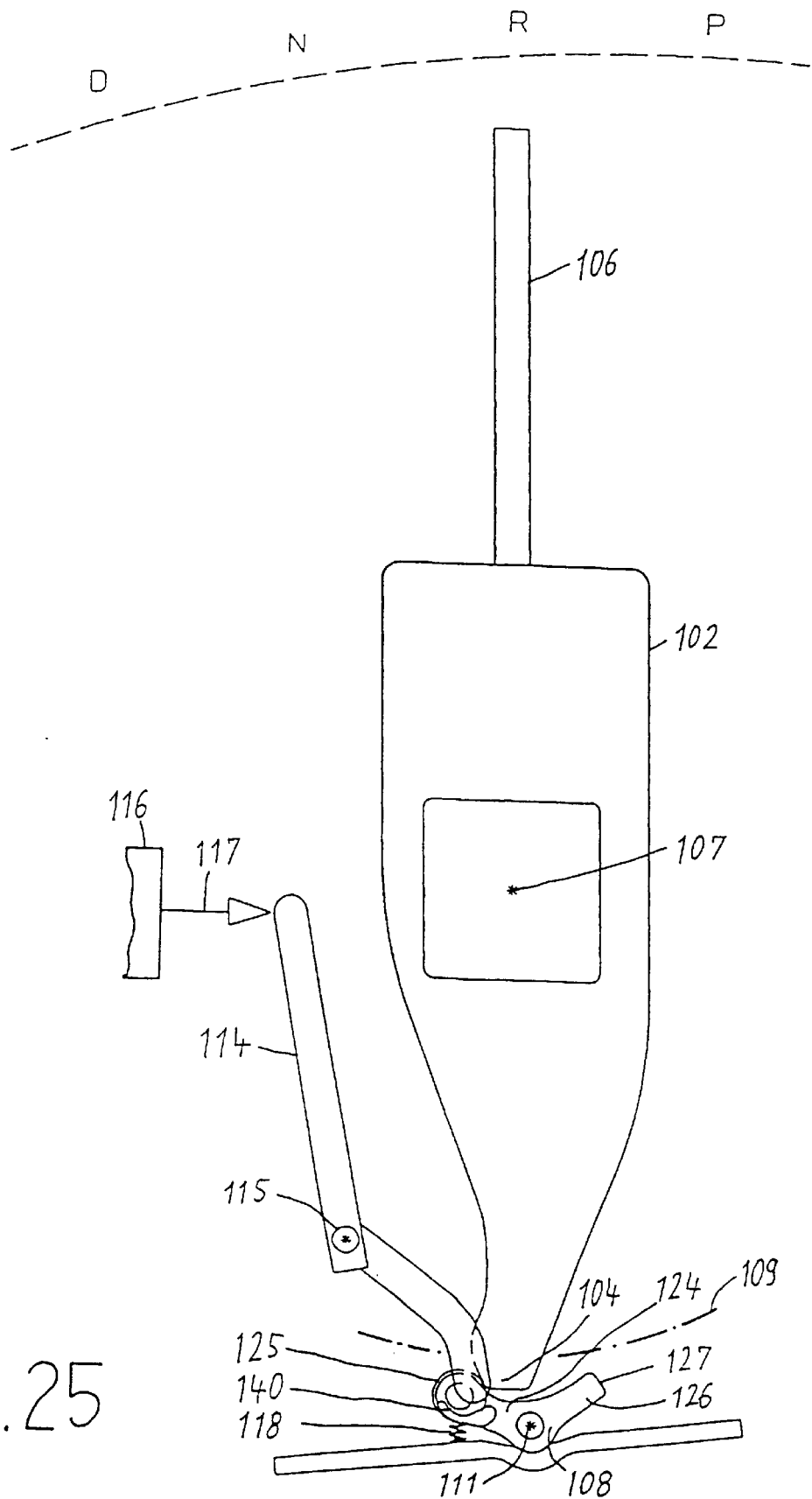
Figure 26:
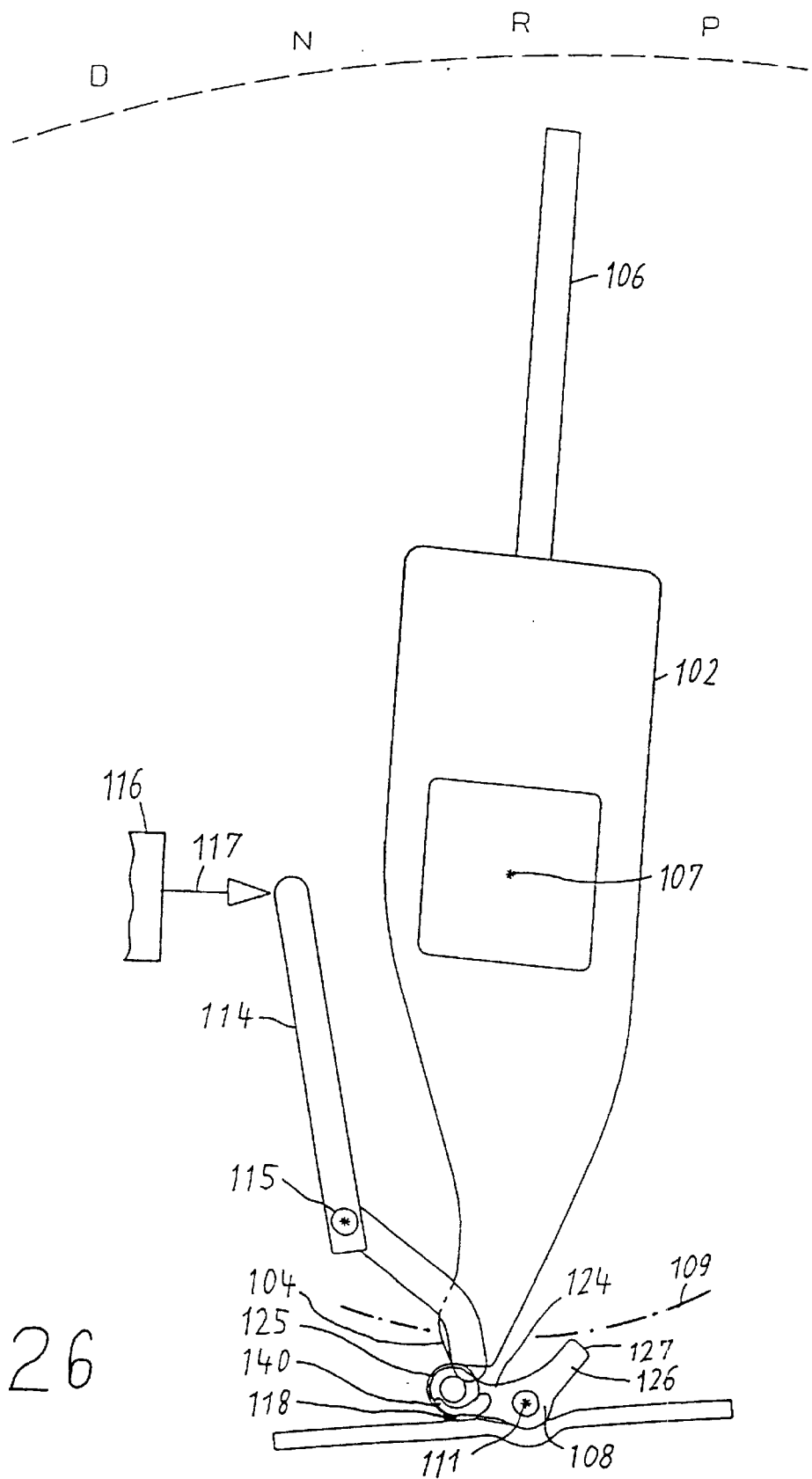
Figure 27:
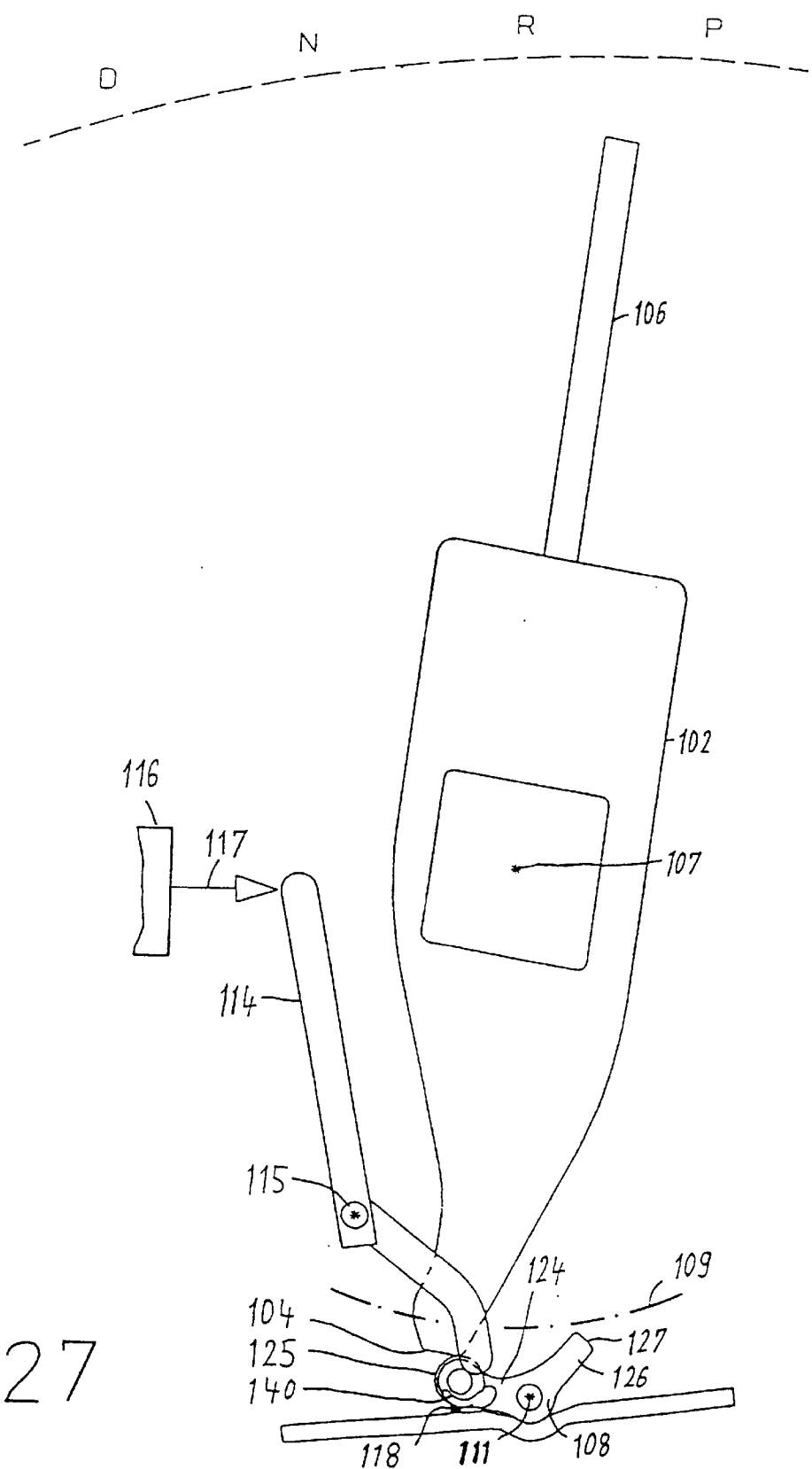
Figure 28:
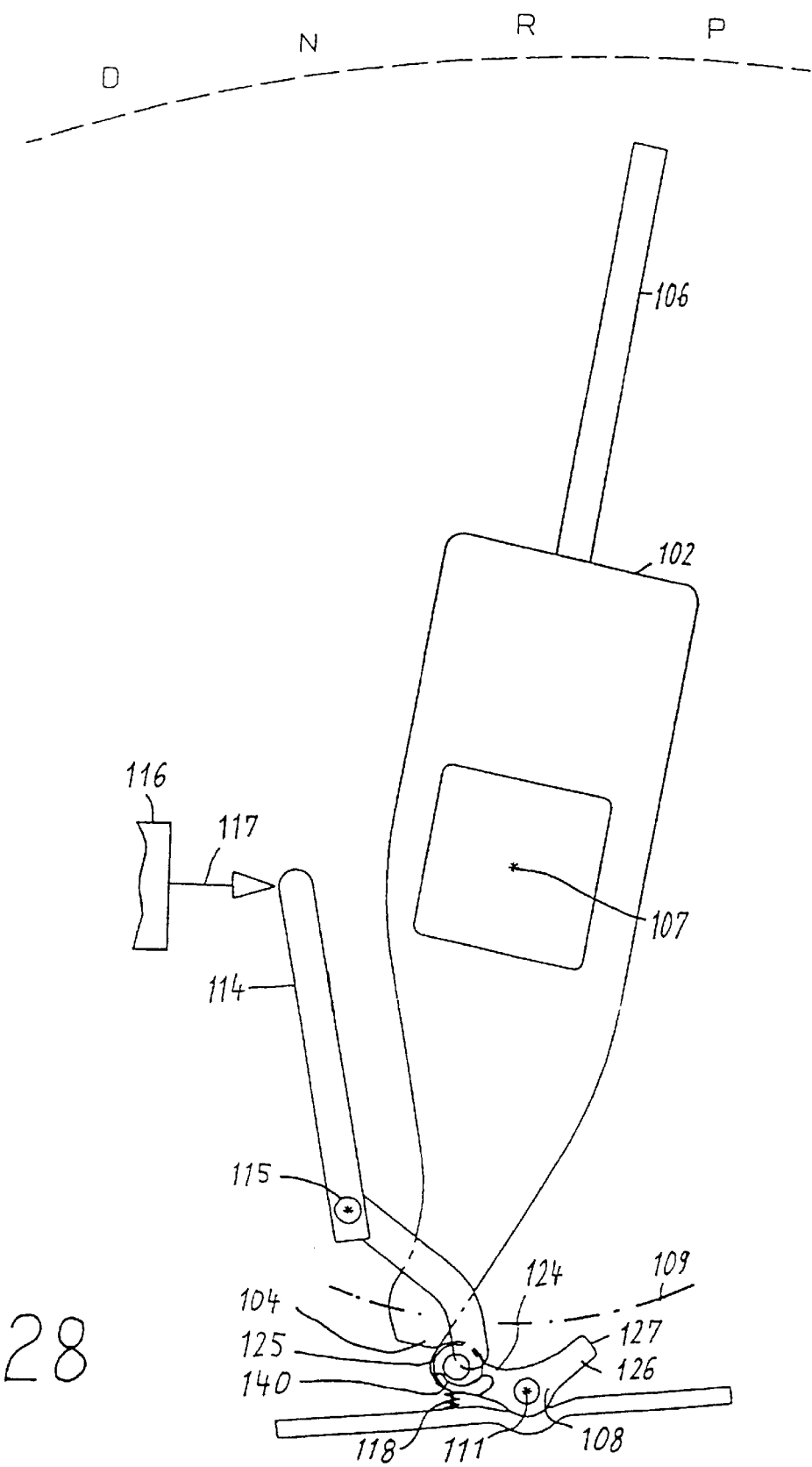
Figure 29:
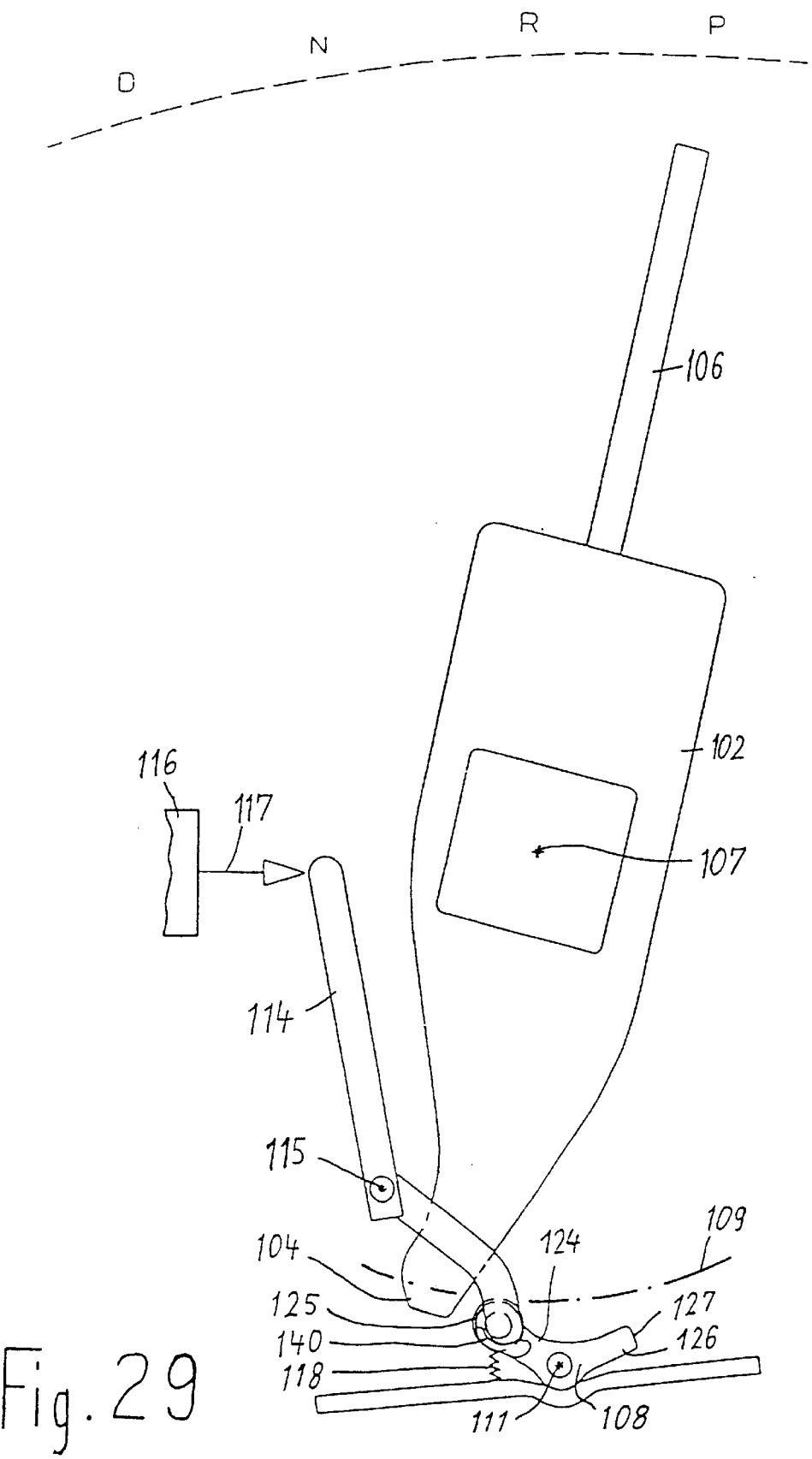

The theoretical functions of the selector in FIGS. 11 to described in Table 2 below.

| Figure | Function | Rocker Position | Magnet | Selector Lever Position | Description |
|---|---|---|---|---|---|
| 11 | P resting position | initial position | no current | P | selector lever in resting position |
| 12 | P blocked | initial position | no current | P | selector lever operated manually; rocker prevents forward movement of selector lever |
| 13 | P released | moves into actuating position | current on | P | rocker actuated by solenoid |
| 14 | P released | actuating position | current on | P to R | rocker released latching lever |
| 15 | movement into R | actuating position | current on | P to R | latching lever tilts rocker up to stop |
| 16 | R reached | initial position | no current | R | selector lever in position R, rocker in initial position |
| 17 | Movement from R to N | initial position | no current | R to N | selector lever can pivot unimpeded into position N |
| 18 | movement from N to D | initial position | no current | N to D | selector lever can pivot unimpeded into position D |
| 19 | D reached | actuated | current on | D | rocker actuated by solenoid through rocker lever since vehicle speed is above limiting value, e.g. 8 km/h |
| 20 | pivot from D to N | actuating position | current on | D to N | rocker in latched position |
| 21 | N reached | actuating position | current on | N | N to R blocked, as speed exceeds limiting value of e.g. 8 km/h |
| 22 | into N | returns to initial position | no current | N | rocker begins to release latching lever if vehicle speed below limiting value of e.g. 8 km/h |
| 23 | into N | initial position | no current | N | latching lever free; can be shifted from N to R |
| 24 | shift from R to N | initial position | no current | R to N | latching lever can shift unimpeded from N to R |
| 25 | reach R | initial position | no current | R | latching lever beings to tilt rocker against force of spring |
| 26 | shift from R to P | actuating position | no current | R to P | latching lever has operated rocker fully |

-continued

| Figure | Function | Rocker Position | Magnet | Selector Lever Position | Description |
|---|---|---|---|---|---|
| 27 | shift from R to P | actuating position | no current | P | latching lever moves to P without energization of solenoid |
| 28 | reach P | actuating position | no current | P | rocker returns to initial position under force of spring |
| 29 | P position at rest | initial position | no current | P | selector lever release; P in resting position as in Figure 1 |

Changes can be made in this second embodiment that are similar to the changes in the first embodiment. Rocker 108 can be actuated by a control link rather than an actuating surface 140. Compression spring 118 can be positioned at any point and can be designed instead as a tension spring which acts in the same rotational direction on the rocker. The system can also be made without latching roller 125. Preferably, however, cam surfaces that are convexly curved in the direction of motion are used so that the parts in contact with one another, following an initial relative movement, can move from a latched engagement position into an unlatched engagement position from which they can be brought completely out of engagement by a manual actuating force on selector lever 106. This not only facilitates unlatching but also permits much greater manufacturing tolerances of the individual parts. The actuation process of rocker 108 can be adapted to various needs by suitable variations in the contours of the actuating surfaces in contact with one another. The limiting vehicle speed at which the electromagnetic control member 16 or 116 in the neutral position N prevents a backward movement of selector lever 6 or 106 into the reverse position R preferably lies in the range between 0 km/hour and 8 km/hour, preferably in a range between 5 km/hour and 10 km/hour. These values are provided only as examples.

Figure 31:
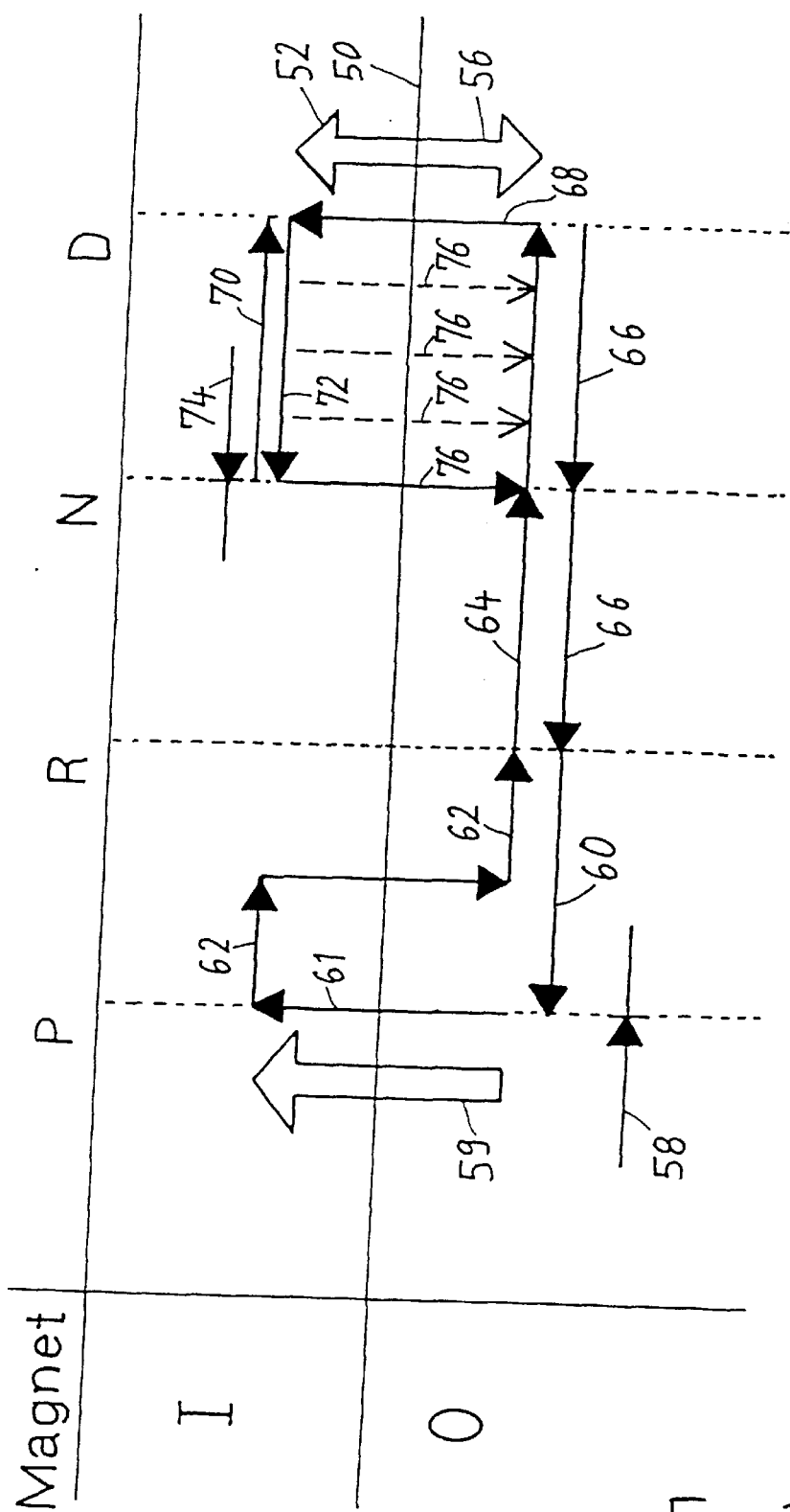
FIG. 31 is a functional diagram of a selector according to the invention, especially according to FIGS. 1 to 30, that has an electromagnetic control member, a positioning spring member, and a selector element which is adjustable to the transmission positions P, R, N, D and possibly additional transmission positions, for example speeds with a fixed transmission ratio.

FIG. 31 shows a preferred functional diagram of the embodiments of FIGS. 1 to 30 described above for the positions P-R-N-D of selector lever 6 or 106. A center line separates an upper line in which the electromagnetic control member 6 or 106 is switched on, characterized by Roman numeral I, from a lower line in which the electromagnetic control member 6 or 116 is switched off, characterized by the numeral 0. The center line 50, at the right-hand side of the figure, also represents the limiting vehicle speed of 0 km/hour or for example 8 km/hour, with the higher vehicle speed being indicated by a double arrow 52 pointing up and a lower vehicle speed by a downwardly directed double arrow 56.

In the park position P, the latching function is maintained without external energy supply, and therefore passively, by spring force (18, 118). Electromagnetic control member 6 or 106 is switched off. This passive latch is indicated in FIG. 31 by an arrow 58. When all the starting conditions according to an arrow 59 have been met, for example the ignition key is inserted into the ignition lock and the ignition is possibly switched on, and the vehicle brake is also actuated, the electromagnetic control member 6, 106 is switched on automatically, so that it lifts the P latch according to an arrow 61 that extends from the bottom toward the top along a center line 50. The selector lever can be moved from P to R as indicated by arrows 62. On this motion path from P to R, the electromagnetic control member 16 or 116 is switched off automatically as soon as rocker 8, 108 has reached a position relative to the latching element 4 or 104 cooperating with it in which the latch is reliably unlatched and can no longer fall back unintentionally into the latching position, according to an arrow 63 shown in FIG. 31 that is directed from top to bottom along center line 50. Now selector element 6 or 106 can be moved through all the adjustment positions R, N, and D and possibly additional forward speed positions and back again to the park position P as long as the vehicle speed is lower than the abovementioned limiting speed, as indicated by arrows 64 and 66. When the selector element is in the neutral position N or the forward position D (or another forward position) and the vehicle speed is higher than the above-mentioned limiting speed, the electromagnetic control member 16, 116 is switched on automatically, as indicated by an arrow 68 in FIG. 31. Thus, selector lever 6, 106 can be moved from N to D and possibly into additional forward speed positions located above neutral position N, but not from neutral position N back into the reverse position R, as indicated in FIG. 31 by arrows 70 and 72. Thus, when the forward vehicle speed is above the limiting speed the R latch is always switched on by the electromagnetic control member 16, 116, as indicated in FIG. 31 by an arrow 74. The electromagnetic control member 16, 116 is switched off automatically only when, and only for as long as, the vehicle speed drops below the limiting value of 8 km/hour for example as indicated by center line 50, as indicated in FIG. 31 by arrows 76. Consequently, the R latch, which acts in the N position, is lifted and selector element 6 or 106 can be moved back into the reverse position R and/or park position P. In park position P, passive latch 58 is once again effective, due to the spring force.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selector for an automatic motor vehicle transmission, comprising:

a manual selector lever secured by a bearing arrangement and mounted to be movable back and forth into various positions to select transmission settings;

a latching lever movably connected with the selector lever, one end which is remote from the selector lever on a side of the bearing arrangement having a first stop surface pointing in one direction of movement and a second stop surface pointing in an opposite direction of movement;

a two-armed rocker mounted to rotate about a rotational axis extending transversely to a direction of movement of the latching lever, said two-armed rocker having two latching surfaces one of said two latching surfaces being movable as a result of rotation of the rocker into a path of movement of said first and second stop surfaces of the latching lever, said two latching surfaces pointing away from one another;

a spring which urges said rocker into a rocker end position in which one of said first and second stop surface of the latching lever is blocked by one of said latching surfaces of the rocker;

a controllable motorized control member by which said rocker is urged opposite to a spring force of the spring into another rocker end position in which the other one of said first and second stop surfaces of the latching lever is latched by the other latching surface of the rocker; and wherein said first and second stop surfaces are formed on outer sides of said latching lever, one of said two latching surfaces being provided on one rocker arm and the other latching surface being located on the other rocker arm, each latching surface being at a radial distance from the rotational axis of the rocker; and wherein a movement path of the first and second stop surfaces of the latching lever extends transversely over the rotational axis of the rocker.

2. The selector according to claim 1, wherein the two latching surfaces are formed on outer ends of the two rocker arms facing away from one another.

3. The selector according to claim 1, wherein the bearing arrangement forms a rotational axis for the selector lever and the latching lever, and further wherein the rotational axis is parallel to the rotational axis of the rocker.

4. The selector according to claim 2, wherein the bearing arrangement forms a rotational axis for the selector lever and and the latching lever, and further wherein the rotational axis is parallel to the rotational axis of the rocker.

5. The selector according to claim 1, wherein at least one of the stop surfaces of the latching lever and the latching surfaces of the rocker arms have a convexly curved surface such that following an initial tilting movement of the rocker from one rocker end position, a latched engagement position changes to an unlatched engagement position which permits the convexly curved surface to move the stop surfaces by a manual force on the selector lever around the respective latching surfaces of the rocker into an out-of-engagement position on the rocker, wherein the latching lever pushes a contacted rocker arm away in a direction from one rocker and position into another rocker end position.

6. The selector according to claim 5, wherein the convexly curved surface is formed by a freely rotatable roller.

7. The selector according to claim 1, wherein the controllable motorized control member acts on the rocker via a lever arrangement.

8. The selector according to claim 1, wherein the rocker is located between control cams of a control mechanism, said control mechanism being movable by the spring and the controlled control member transversely to a rocker tilting axis for alternating tilting the rocker between said rocker and positions.

9. The selector according to claim 8, wherein between the latching lever and the control mechanism, a dog is provided by which the latching lever engages the control mechanism in order to tilt down the rocker when the stop surface of the latching lever are moved by the selector lever manually from a middle rocker position in a direction of a free end of the rocker arm, without the controlled control member being actuated, whereupon a distance traveled by the dog is dimensioned so that the dog releases the control mechanism again if one of the stop surfaces of the latching lever can engage the latching surface of the rocker arm with which it is associated, and wherein the dog does not couple the latching lever in an opposite movement direction with the control mechanism.

10. The selector according to claim 1, wherein a latched engagement position of the first stop surface of the latching lever with one of the latching surfaces of one rocker arm, which is urged by the spring into an upwardly tilted rocker end position, is associated with a park position of the selector lever.

11. The selector according to claim 1, wherein a latched engagement position of the second surface of the latching lever with one of the latching surfaces of the other rocker arm, which is urged by the controlled control member into an upwardly tilted rocker end position, is associated with a neutral position of the selector lever.

12. The selector according to claim 1, wherein one position of the stop surfaces of the latching lever which is located centrally above the rocker tilting axis is associated with a reverse position of the selector lever.

13. The selector according to claim 1, wherein an electronic control device is provided which controls the controllable control member as a function of predetermined conditions.

* * * * *